United States Patent
Millerand et al.

(10) Patent No.: US 11,539,598 B2
(45) Date of Patent: Dec. 27, 2022

(54) DEVICES AND PROCESSES FOR DATA SAMPLE SELECTION FOR POWER CONSUMPTION MANAGEMENT

(71) Applicant: CRAFT.AI, Paris (FR)

(72) Inventors: Gaëtan Millerand, Paris (FR); Matthieu Boussard, Paris (FR); François Pellissier, Paris (FR); Chahram Becharat, Paris (FR)

(73) Assignee: CRAFT.AI, Paris (FR)

( * ) Notice: Subject to any disclaimer, the term of this patent is extended or adjusted under 35 U.S.C. 154(b) by 0 days.

(21) Appl. No.: 17/072,330

(22) Filed: Oct. 16, 2020

(65) Prior Publication Data

US 2022/0124002 A1 Apr. 21, 2022

(51) Int. Cl.
*H04L 41/16* (2022.01)
*H04L 67/101* (2022.01)
*H04L 67/1008* (2022.01)
*G06F 1/3206* (2019.01)

(52) U.S. Cl.
CPC ............ *H04L 41/16* (2013.01); *G06F 1/3206* (2013.01); *H04L 67/101* (2013.01); *H04L 67/1008* (2013.01)

(58) Field of Classification Search
CPC ... H04L 41/16; H04L 67/1008; H04L 67/101; G06F 1/3206
See application file for complete search history.

(56) References Cited

U.S. PATENT DOCUMENTS

| 2014/0052302 | A1* | 2/2014 | Moon ................... | G06F 1/3203 700/291 |
| 2018/0299944 | A1 | 10/2018 | Liang et al. | |
| 2019/0122132 | A1* | 4/2019 | Rimini ................... | G06N 7/005 |
| 2020/0044938 | A1* | 2/2020 | Dias ........................ | H04L 67/34 |

FOREIGN PATENT DOCUMENTS

| GB | 2543281 A | 4/2017 |
| WO | 2019/243524 A1 | 12/2019 |

OTHER PUBLICATIONS

Xuan Hong Dang, "Incremental and Adaptive Clustering System Data over Sliding Window", 2009, Springer-Verlag Berlin Heidelberg, p. 660-674 (Year: 2009).*

(Continued)

*Primary Examiner* — Ryan J Jakovac
(74) *Attorney, Agent, or Firm* — Maier & Maier, PLLC

(57) ABSTRACT

Data samples are selected for power consumption management. This includes receiving samples associated with respective times, distributed in a sliding time window as current samples and in a past period as past samples. Selected past samples are determined by keeping a first share of the past samples, including most recent ones, and a second share through eliminating among the past samples deprived from the first share, called a complementary share, part of the past samples in function of at least some of the current samples and of elimination conditions depending on similarity criteria applied to at least the first and complementary shares. The selected past samples are provided with the current samples for power consumption management. Applications to power failure detection and power consumption dynamic adaptation.

17 Claims, 12 Drawing Sheets

(56) References Cited

OTHER PUBLICATIONS

D'Amato et al., "Forgetting methods for white box learning", International Conference on Practical Applications for Agents and Multi-Agent Systems, in Trends in Practical Applications of Scalable Multi-Agent Systems, PAAMS 2016, 386 pages, pp. 225-236.
S. M. Lundberg et al., "A unified approach to interpreting model predictions", NIPS Conference, 2017, arXiv: 1705.07874, 10 pages.

* cited by examiner

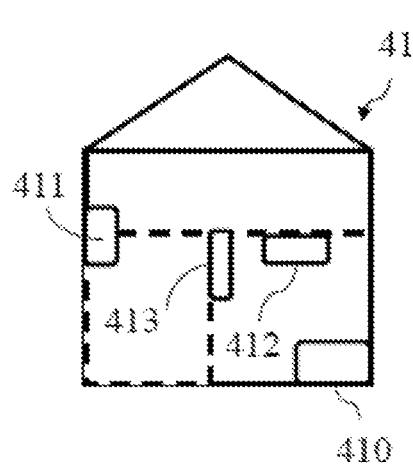
FIG. 2A
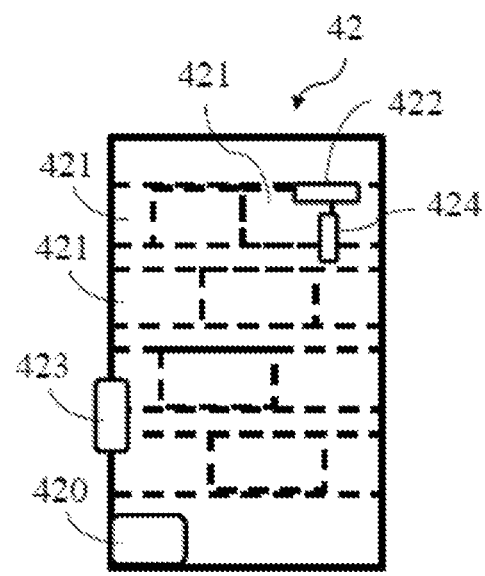
FIG. 2B
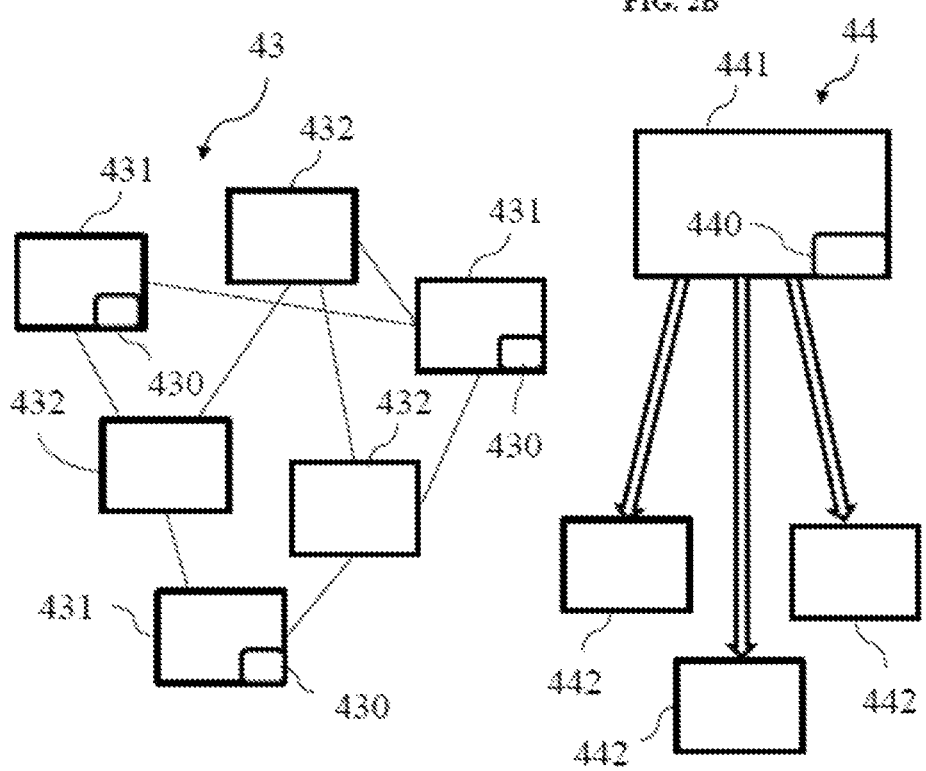
FIG. 2C
FIG. 2D

DEVICES AND PROCESSES FOR DATA SAMPLE SELECTION FOR POWER CONSUMPTION MANAGEMENT

FIELD

The invention relates to the domain of power consumption management, and regards more particularly the upstream selection of proper data samples.

BACKGROUND

Among the societal problems, the management of energy plays a pivotal and ubiquitous role worldwide, at the individual as well as collective levels. Supplying enough power to notably households, office buildings and industry plants as needed, while avoiding economically and environmentally prejudicial losses, proves an increasing challenge that draws raising public and political attention. Also, optimizing energy usage by individuals and businesses became a significant and growing care, for financial reasons but also due to heightened sensitivity to sustainable development and natural resource preservation. According to several non-governmental organizations, around 30% of the consumed energy is thus totally wasted.

In addition, interconnected energy network technologies such as smart grids thrived, while network power sharing such as peer-to-peer (P2P) energy trading is taking off, integrating locally produced renewable energies such as solar energy or wind. Those solutions require efficient power management, whether at a centralized or local stage, so as to offer the expected advantages.

Another aspect of power management is the ability to identify failures, so as to avoid or promptly overcome potential damages, ranging from useless expenses or comfort inconvenience to serious accidents.

The development of artificial intelligence (AI) algorithms may provide precious support in facing the above challenges, and various solutions have been proposed in this respect. In particular, machine learning (ML) enables automatic exploitation of collected data samples so as to reach and enhance the relevance of predictions, failure detections, and power supply or consumption control. ML may thereby allow to reduce waste through identifying main losses of energy and to optimize energy production.

Theoretically, gathering over time a growing amount of data pertaining to a concerned power consumption situation should offer a progressively enhanced and refined related ML model, providing continuously enhanced outputs. This however proves wrong in a number of cases, in particular where relatively slow behavioral evolutions take place while rare events need to be tracked as potential incident hints. An underlying reason behind such possibly surprising performance degradation, in spite of additional information available to ML systems, is basically due to computing resource limitations (notably processing time and memory), which constrain learning capabilities and force the introduction of significant approximations in the exploited models. Preserving the relevance of obtained results in a dynamic evolving frame while sparing the computing resources thus appears as a determining technical issue.

A particular aspect of those ML constraints amounts to an appropriate tradeoff between remembering and forgetting. Indeed, due to restraining bounds in computing resources and to resulting approximation models, remembering too much past information, i.e. usually too old information, may disturb the efficacy of the system. This could e.g. take the form of outdated data interfering with presently relevant ones, or of behavioral interpretation distorted by past model adjustments. On the other hand, while forgetting techniques exist for disposing of old data, they may naturally be prejudicial in a number of situations, in particular where rare events need consideration. This difficulty is well known to the person skilled in the art as the sensitivity-stability dilemma or stability-plasticity dilemma.

An extreme though relatively widespread expression of this delicate tradeoff consists in catastrophic interference (also called catastrophic forgetting). This occurs with artificial neural networks when previously learned information is suddenly and massively forgotten upon learning new information. Multiple solutions have been worked out for overcoming the latter risk, such as e.g. node sharpening (as described by R. M. French in "Pseudo-recurrent connectionist networks: an approach to the 'sensitivity-stability' dilemma", Connection Science, 9(4), pages 353-379, 1997), pseudo-recurrent backpropagation networks (notably developed in the article by A. Robins "Catastrophic Forgetting, rehearsal and pseudorehearsal", Connection Science, 7, pages 123-146, 1995), or elastic weight consolidation (EWC) (as disclosed in the article by Kirkpatrick et al. "Overcoming catastrophic forgetting in neural networks", PNAS, 114 (13), pages 3521-3526, 2017).

In fact, when collected data are regularly fed over time via a datastream, so that the exploited ML model needs to continuously learn on newly received data without fully forgetting the past, two competing needs may arise: on one hand, detecting quickly a concept drift so as to adapt predictions to corresponding changes, and on the other hand, preserving the ability to detect anomalies by keeping in memory old unique cases. Also, a lot of temporal events have to be taken into account, for example seasons, time of day, or day of week. Specially suited solutions are then required, beyond generic versions of the above-mentioned developments.

Notably, a strategy known as time forgetting consists in sliding a time window applied to an incoming datastream and deleting oldest samples as and when new samples are added. Such a method is described by X. H. Dang et al. in "Incremental and adaptive clustering stream data over sliding window", International Conference on Database and Expert Systems Applications, DEXA '09, pages 660-674, 2009. This may prove appropriate for relatively stable behaviors between successive time window periods, and where time windows are not too large.

Otherwise, either important information may be lost because of too small time windows, or adaptation may be slow (i.e. too computationally demanding) because of too large time windows.

For example, document US-2019/0122132 A1 (to GRID4C) describes a method for identifying abnormalities in personal energy consumption. According to this method, a personal dynamic forecast model of energy usage patterns is generated in sub-hourly resolution for defined time periods, and an adaptive gradient boost iterative learning algorithm is dynamically applied. The latter uses predefined periodical features and determining abnormalities of actual energy usage by comparing predictions (relying on regression-tree based historical usage data) and actual usage.

In such a model, a relative stability of consumption usage by the concerned customer is relied on, and the computations are based on a relevant time period, which implicitly carries out time forgetting. A downside is that drifts in the energy consumption (e.g. schedule change or new household) may be missed or belatedly dealt with, preventing a prompt adaptation to a modified situation.

An example of a dedicated approach adapted to deal with both concept drift and anomaly detection is the Seasonal Autoregressive Integrated Moving Average (SARIMA) model. It can be decomposed into four parts to be weighted for modelling a desired behavior: Seasonal, representing how much the seasonality is important in the model; Auto-Regressive, determining a number of previous steps of the datastream to be taken into account (an evolving variable of interest being regressed on its own lagged values); Integrated, determining an order of the derivative for considering the time series of data as stationary; and Moving Average, determining how much previous errors are to be used (regression error).

A drawback of this model is that tuning the associated parameters makes it too specific and may not leave enough flexibility to learn new behaviors that can occur after a first training time.

Other widely used models in temporal problems are neural networks, notably Recurrent Neural Networks (RNNs). In RNNs, connections between neurons form a directed graph along a temporal sequence, which provides a temporal dynamic behavior. This ensures that concept drifts are taken into account. However, a traditional RNN is exposed to a gradient vanishing issue while backpropagating errors through the network, which makes it unsuited to learn long term dependency. A consequence is that it usually misbehaves on anomaly detection.

An RNN with a gated state or gated memory (in which the internal state is under a direct control by the neural network) enables to overcome that difficulty, by enabling to store long-term dependencies. It can in particular take the form of a Long Short-Term Memory (LSTM), comprising a cell and three gates regulating the time flow of information into and out of the cell, or of a Gate Recurrent Unit (GRU), comprising a cell and two such gates.

A difficulty raised by the use of LSTM or GRU solutions is however their complexity, because of a lack of related explanations. Grasping a better understanding of prediction or decision mechanisms appears indeed particularly important in power consumption management, e.g. with a view to modifying electrical systems, construction arrangements or energy distribution in a sensible way.

Another issue with LSTM and GRU models is the important amount of data needed for training them. It goes back to the key question of computational resources, which basically underlie the sensitivity-stability tradeoff.

Ongoing efforts have been made to solve those issues. In particular, local explanations may be obtained with frameworks like SHAP (for SHapley Additive exPlanations, which assigns to each feature an importance value for a particular prediction) and LIME (for Local Interpretable Model-agnostic Explanation). Both methods are described notably by S. M. Lundberg and S.-I. Lee in "A unified approach to interpreting model predictions", NIPS Conference, 2017, arXiv: 1705.07874. Also, the required training data may be reduced by using some transfer learning to avoid retraining the whole network. Anyway, those solutions do not seem yet mature enough for industrial purpose.

An ML achievement relying on RNN networks, including LSTM, is described in patent application WO-2019/243524 (to Moixa Energy Holdings Ltd) for optimizing and managing distributed energy storage and flexibility resources on a localized and group aggregation basis (in relation with FIG. 10A). According to the developed solution, RNNs are exploited in a dual way: a first network set aids in pattern recognition of an input sequence or classification of a typical event or set of behavior, while a second network set branched to outputs of the first network set is dedicated to each of various target appliances or to various time schedules, so as to help dynamically validate real-time outputs from the first network set on key properties, to test data or to recognize a separate set of characteristics. The second network set may further be arranged to re-enforce or train the first network set.

Such implementations may help to alleviate to some extent the previously mentioned issues, but however subject to specific arrangements and preprocessing configurations, thereby potentially requiring demanding developments when dealing with various situations.

A different approach particularly suited to continuous learning adaptation to user behavior was disclosed in the article by A. D'Amato and M. Boussard, "Forgetting methods for white box learning", International Conference on Practical Applications for Agents and Multi-Agent Systems, in Trends in Practical Applications of Scalable Multi-Agent Systems, PAAMS 2016. It is described in § 3.3 as "Leaf Forgetting" and involves a Decision Tree. As explained therein, a training set is partitioned in accordance with the leaves of the tree. When a new sample is joined to the training set, it is checked in which leaf of the previous tree the sample is arriving, and all the data stored in that leaf have respective weights increased. When a weight becomes higher than a preset maximum value, the corresponding sample is deleted from the training set.

Such models may be particularly suited to the processing of data streams, because increasing weights in the various leaves may provide a balance over time between learned behaviors. This may further ensure a proper mitigated forgetting, because oldest samples corresponding to a common behavior, i.e. falling in leaves that have many samples, are forgotten, while rare samples are kept over several learning periods.

The interest of those models over the absence of forgetting, time forgetting or random forgetting (which differs from time forgetting in that every new case added to a dataset leads to the random deletion of a stored case) is clearly documented in the above article by A. D'Amato and M. Boussard. Included comparison tests point out the substantial computational needs failing forgetting, which lead to excessive learning time of new behaviors. They also demonstrate the high performance of leaf forgetting compared with the other tested solutions.

Anyway, a potential flaw of the latter method is that it may lead to keeping very old behavior representations that are no longer relevant, thereby prejudicing the most efficient consideration of concept drifts.

The need of potentially efficient solutions to deal with power consumption management in a dynamic and flexible way, while being able to face promptly situation drifts as well as anomalies, thus remains quite significant and increasingly attractive in view of the ongoing technological and societal evolutions. This stands true for both individual and collective energy use, and ranges from consumer consumption and industrial plants to power supply and P2P energy trading.

More precisely, related ML implementations enabling to avoid high, often prohibitive, inherent computing cost implementations (in terms of processing time and memory) in the absence of satisfying sensitivity-stability tradeoff achievements, would be highly desirable.

SUMMARY

A purpose of the present disclosure is to provide a flexible tool for power consumption management, which may be potentially efficient notably when dealing with datastreams.

The present disclosure is also directed to judiciously selecting items among available data samples, which may be then exploited for power consumption management, notably via machine learning operations. In this respect, the disclosure sets forth solutions that may potentially provide a flexible and efficient tradeoff between remembering and forgetting, thereby enabling to avoid excessive or prohibitive computation costs without sacrificing the relevance of the selected data samples to effective and reliable power consumption management.

The present disclosure may further apply to various fields of power consumption management, including notably centralized power supply operations, failure detection, autonomous local power management, collective interactive energy sharing, energy cost control, distributed management of energy networked systems, and controlled integration of renewables in energy mix.

Preliminary Definitions

In the present disclosure, the term "power consumption management" broadly designates dealing with or controlling operations pertaining to using up energy sources, whatever their nature (e.g. electric, solar, wind, hydraulic, nuclear, hydrokinetic, geothermal, fossil), the management stage (e.g. supply, storage, exploitation, distribution, sharing), the exploitation scale (e.g. individual, collective) and the exploitation frame (e.g. household, commercial, industrial).

"Data samples related to power consumption" refers to any kind of information items potentially relevant to power consumption management, and may include valued, nominal or ordinal data, while a single data sample may be unidimensional or multi-dimensional. Such data samples may e.g. include any combination of levels of power consumption, supply or demand, outside weather conditions such as temperature, humidity or wind, inside environment conditions such as temperature or humidity, occupancy patterns, schedule information such as time of day, day of week, month or season, activity patterns such as work or leisure, energy-related financial expenses, power storage levels, type of energy source, localization such as household room, building office, or P2P energy trading unit.

By "decisional guidance relevant to power consumption management", it is meant information, instructions or analysis results leading to some actions regarding power consumption management. This decisional guidance may be automatically executed in machine processes or by actuators. It may provide clear and complete instructions or indications to one or more users or operators as to how to proceed. It may give decisional information pertaining e.g. to a failure or anomaly, so that users or operators can properly react. It may provide instructions or indications pertaining to parts of complex systems, so that proper decisions should be taken on complementary grounds, whether automatically or by appropriate operators, taking account of other factors pertaining to those complex systems.

The terms "adapted" and "configured" are used in the present disclosure as broadly encompassing initial configuration, later adaptation or complementation of the present device, or any combination thereof alike, whether effected through material or software means (including firmware).

The term "processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

A similarity consists in the identification of equivalence relationships between objects based on a similarity measure (i.e. a real-valued function that quantifies the similarity between two objects) applied to couples of objects, two objects being equivalent when they fall in a same equivalence class or cluster. The objects may be unidimensional or multi-dimensional, and may pertain to valued data (metric processing) as well as to nominal or ordinal data (non-metric processing). The considered equivalence may be structural, automorphic or regular (as known to a person skilled in the art).

Machine learning (ML) designates in a traditional way computer algorithms improving automatically through experience, on the ground of training data enabling to adjust parameters of computer models through gap reductions between expected outputs extracted from the training data and evaluated outputs computed by the computer models.

A white box is a subsystem whose internals can be viewed, while a black box can only be viewed in terms of its inputs and outputs or of its transfer characteristics.

A hypes parameter presently means a parameter used to carry out an upstream control of a model construction, such as a remembering-forgetting balance in sample selection or a width of a time window, by contrast with a parameter of a model itself, which depends on specific situations. In ML applications, hyper-parameters are used to control the learning process.

Datasets are collections of data used to build an ML mathematical model, so as to make data-driven predictions or decisions. In supervised learning (i.e. inferring functions from known input-output examples in the form of labelled training data), three types of ML datasets (also designated as ML sets) are typically dedicated to three respective kinds of tasks: training, i.e. fitting the parameters, validation, i.e. tuning ML hyperparameters (which are parameters used to control the learning process), and testing, i.e. checking independently of a training dataset exploited for building a mathematical model that the latter model provides satisfying results.

A Decision Tree is a decision support tool using a tree-like model of decisions, having internal nodes, branches and leaf nodes (or leaves), each internal node amounting to testing an attribute, each branch representing an outcome of such testing, and each leaf representing a class label associated with a decision taken from attribute computations. Each leaf may notably be viewed as an equivalence class or cluster, thereby providing a similarity model with structural equivalence.

Gradient boosting is an ML method that combines iteratively weak ML prediction models (such as e.g. Decision Trees) into a single stronger ML prediction model, by optimizing a cost function over a function space by an iterative gradient descent (i.e. by iteratively choosing a function pointing in the negative gradient direction).

Reservoir sampling is a randomized algorithm for maintaining a reservoir having a preset size from a population of items having an unknown size and revealed over time, in a single pass over the items, by initializing the reservoir with the first items of the population and then iteratively and randomly selecting in the population an item to be selected and an associated replacement position in the reservoir.

A neural network or artificial neural network (ANN) designates a category of ML comprising nodes (called neurons), and connections between neurons modeled by weights. For each neuron, an output is given in function of an input or a set of inputs by an activation function. Neurons are generally organized into multiple layers, so that neurons of one layer connect only to neurons of the immediately preceding and immediately following layers.

An ensemble model is an ML model that uses multiple constituent ML algorithms to obtain better predictive performance than the constituent ML algorithms taken alone.

A random forest is a particular ensemble model relying on constructing a multitude of decision trees at training time, and on outputting results based on the joint consideration of the individual trees, i.e. the mode of their classes in classification, and the mean prediction in regression.

The above ML definitions are compliant with their usual meaning, and can be completed with numerous associated features and properties, and definitions of related numerical objects, well known to a person skilled in the ML field.

Additional terms will be defined, specified or commented wherever useful throughout the following description.

Objects of the Disclosure

An object of the present disclosure is notably a device for selecting data samples related to power consumption so as to proceed with power consumption management. The device comprises:
- at least one input adapted to receive available data samples related to power consumption and associated with respective sample times, those available data samples being distributed into a sliding time window including at least one new batch of data samples, the available data samples being then called current samples, and into a past period preceding said time window, the available data samples being then called past samples;
- at least one processor configured for determining in the past period, selected past samples to be kept for the power consumption management, by eliminating part of the past samples in function of at least some of the current samples and of elimination conditions depending on at least one similarity criterion applied to at least the past samples;
- at least one output adapted to provide the selected past samples as a complement to the current samples for the power consumption management.

According to the disclosure, the processor(s) is/are configured for determining the selected past samples by more precisely keeping among the past samples:
- a first share of the past samples, consisting in most recent ones of the past samples, irrespective of the similarity criterion/criteria; and
- a second share of the past samples through eliminating among the past samples deprived from the first share, called a complementary share of the past samples, part of the past samples in function of the at least some of the current samples, and of the elimination conditions depending on the similarity criterion/criteria applied to at least the first share and the complementary share of the past samples.

The data samples related to power consumption may be repeatedly received, including possibly via streaming They may be derived from automatic measurements, e.g. from meters, sensors or monitoring units.

The received available data samples may be derived from a preselection among a broader set of received data samples, e.g. through random sampling executed on the flight on incoming samples. This may notably prevent an excessive amount of entered data while ensuring a representativeness of the gathered available data samples within the sliding time window. For example, a reservoir sampling strategy may be exploited. In this way, all incoming samples have the same probability to be in the reservoir, the updated probability of the reservoir making it possible to do it on the flight.

The sliding time window may have a constant length, e.g. corresponding to a cyclic behavior such as a week, a month or a year. It may be set by a user.

The samples are said "distributed" into the sliding time window and the past period for sake of conciseness, for meaning that they are associated with respective times located in the relevant time periods.

The targeted downstream power consumption management may be automatized, e.g. by machine-controlled supply, storage or consumption power adjustment, or by system fixing of detected anomalies. It may be repeated over time, e.g. iteratively, based on progressively incoming information.

It deserves noting that the first share of the past samples is used together with the complementary share of the past samples in applying the similarity criterion/criteria on which the elimination conditions depend, while that first share is immune from deletion contrary to the complementary share. As to the current samples, at least some of them are determining in the deletion of some of the past samples, through the elimination conditions. They may be kept together with the selected past samples for the power consumption management.

The device for selecting data samples may be coupled to a device for providing power consumption management information, instructions or guidance (included in the form of a joint device grouping related functionalities), which may implement machine learning. Both devices may rely on same or like similarity criteria.

The device for selecting data samples as disclosed may be particularly efficient for avoiding excessive computation costs while potentially enabling reliable power consumption management. This is due to its dual nature, combining the exploitation of the first share and of the second share.

More precisely, keeping the first share of the past samples amounts to some kind of time forgetting (or random forgetting), in which deleted past samples are associated with times lying before the joining of the time window and of a preceding time interval. In addition, keeping the second share of the past samples amounts to some kind of generalization of leaf forgetting, presently called "similarity forgetting", in which clusters may be obtained from other models than decision trees, or similarity criteria may rely on similarity measures without involving clusters, while part of the past samples (i.e. the first share) is immune from deletion.

This combination of time forgetting and similarity forgetting offers a potentially powerful tool for efficiently facing the sensitivity-stability dilemma, able to quickly follow concept drifts, while keeping track of older behaviors helpful in e.g. detecting anomalies. In particular, similarity forgetting (the second share) may allow to keep only track of rare behaviors throughout ages thanks to exploiting similarity criteria in sample deletion. For example, samples falling in common clusters may be more prone to be replaced by new ones, because more new samples fall in those clusters. This may give the possibility to remind behaviors on a long term scale while updating quickly common behaviors and following global concept drifts. On the other hand, time forgetting (the first share) may allow to turn down excessively old behaviors while preserving most recent past information, the deletion actions being focused on the past samples preceding the first share.

A remarkable property of the present device for selecting data samples is that in some embodiments, it may enable a controlled balance between time forgetting and similarity forgetting, which may be stricken in function of the targeted kind of power consumption management. This may be reflected in the respective sizes (i.e. the numbers of the past samples) of the first share and of the second share. For example, an appropriate tuning suited to detecting anomalies related to seasonality on an electric network may emphasize similarity forgetting rather than time forgetting so as to keep odd behavior in memory, while setting a time window large enough to take into account a past year. While in case of a datastream subject to important concept drift, e.g. a change of householder, a proper tuning may on the contrary substantially emphasize time forgetting rather than similarity forgetting, so as to forget old behavior as fast as possible.

The balance between time forgetting and similarity forgetting may be modified along time, included possibly along successive positions of the sliding time window.

The device for selecting data samples may further make possible a basically white box solution, in particular when using decision trees, potentially providing fully and readily explainable results, by contrast with ANN solutions such as e.g. LSTM or GRU. This may thus substantially facilitate proper decisions pertaining to power management, completing and going beyond reactive adaptations to current situations or punctual anomaly treatments.

In particular modes focused on dynamic processing:
the input(s) is/are adapted to repeatedly receive over time updated sets of the available data samples, derived from keeping in previous sets of the available data samples at least part of the current samples and of the selected past samples;
the processor(s) is/are configured for repeatedly determining the selected past samples among the updated sets of the available data samples;
the output(s) is/are adapted to repeatedly provide the selected past samples of the updated sets, for dynamically proceeding with the power consumption management over time.

In datastream processing, for a given lastly updated set of the available data samples, not only the past samples but also most of the current samples in the sliding time window may have already been considered in the previous set of the available data samples. Then, the new batch of data samples contributes to modifications of the available data samples by adding new samples into the sliding time window, while oldest samples in the previous time position of the time window are switched to past samples of the past period.

In advantageous modes, the processor(s) is/are configured for eliminating oldest ones of the past samples in respective clusters of the available data samples obtained from the similarity criterion/criteria applied to at least the first share and the complementary share of the past samples, in function of the elimination conditions depending on assignments to the clusters of the at least some of the current samples.

The oldest past samples eliminated in the respective clusters are then considered at cluster levels, rather than at global level. Namely, some past samples may be deleted while older ones may be kept, insofar as the latter belong to other clusters than the former.

In particular modes based on clusters, the processor(s) is/are configured for eliminating in the respective clusters the oldest ones of the past samples through taking account of the at least some of the current samples in a chronological order of the current samples.

The time arrival of the current samples is then decisive for the identification and elimination of the oldest past samples in the respective clusters, i.e. for properly focusing on the appropriate clusters and on their respective oldest past samples. In this way, the current samples may drive away the concerned past samples as and when considered, which may be particularly suited notably to a streaming system.

In some modes, the elimination conditions for at least one of the clusters include a cumulated amount of the available data samples in that cluster being above a preset threshold.

This may take the form of weights assigned to the samples in the cluster.

In attractive implementations, the clusters are built from at least one decision tree model, the clusters corresponding to leaf nodes.

For example, one or more decision tree models may be produced, and the similarity criteria may correspond to belonging to same leaves of the built trees. The same may apply to tree-based models such as notably random forests, or the gradient boosting framework known as XGBoost (open-source software library) and described e.g. by T. Chen and C. Guestrin in "XGBoost: a scalable tree boosting system", Proceedings of the $22^{nd}$ ACM SIGKDD International Conference on Knowledge Discovery and Data Mining, pages 785-794, 2016.

In other advantageous modes, the similarity criterion/criteria used for eliminating the part of the complementary share is given by lowest prediction errors associated with the past samples in relation with a machine learning model for the power consumption management, that machine learning model providing predictions based on at least the first share and the complementary share of the past samples.

With such models, the construction of clusters may no longer be required for past sample elimination, since the mere comparison of prediction errors among the past samples of the complementary share may be enough for determining the past samples to be deleted. However, the potential white box advantages of decision trees may be lost.

In some modes, the processor(s) is/are configured for eliminating the part of the past samples based on the similarity criterion/criteria being applied to the past samples irrespective of the current samples.

Thus, in the implementations with clusters, the current samples may be ignored in the formation of the clusters, while at least some of them are determining in the deletion of part of the past samples, through the elimination conditions applied to the clusters.

In the implementations with prediction errors, the current samples may be ignored in the predictions of the ML model providing the prediction errors, while at least some of those current samples are determining in the deletion of part of the past samples, through e.g. proceeding with replacement operations based on the total number of the current samples.

In embodiments, the processor(s) is/are configured for determining the first share and the second share of the past samples so that the first share and the second share have relative proportions given by a hyper-parameter.

According to an automatic determination of that hyper-parameter:
the input(s) is/are adapted to receive evaluations of relevance of the selected past samples, those evaluations of relevance being respectively associated with successive time positions of the time window and determined with respect to machine learning processing for the power consumption management corresponding to next time positions of the time window; and
the processor(s) is/are configured for determining the hyper-parameter by selecting among at least two candidate values of the hyper-parameter a best candidate value providing smallest averaged errors associated with the evaluations of relevance over the successive time positions of the time window.

This hyper-parameter determination may thus be provided by a rolling validation, proper to time-series data, ensuring that the evaluation is based on not yet exploited data rather than already seen data. A model may notably be built for every time position of the time window and evaluated with the data of the next time position of the time window, obtained errors on each validation fold being averaged over all the considered successive positions of the time window. This strategy may be able to detect and take account of concept drifts in data, which often correspond to an important drop of predictive performances of a model.

The number of tested candidate values may e.g. be comprised between 5 and 12 (included), and more precisely between 8 and 10 (included).

The width of the sliding time window may be automatically adjusted likewise.

Advantageously, the power consumption management includes power failure detection and/or power consumption dynamic adaptation.

In some modes, the similarity criterion/criteria includes at least one criterion used in machine learning processing for obtaining decisional guidance relevant to the power consumption management.

This may establish a strong connection between the selection of the kept data samples and the downstream processing of those data samples, thereby potentially providing particularly efficient synergies.

In particular, the at least one similarity criterion may be fully applied at the data sample selection stage and then exploited in obtaining the decisional guidance.

The disclosure also relates to a system for power consumption management. That system comprises a device for selecting data samples according to the present disclosure, and a device for providing decisional guidance relevant to the power consumption management based on the selected past samples and the current samples through machine learning processing.

Another object of the disclosure is a method for selecting data samples related to power consumption so as to proceed with power consumption management. The method comprises:
receiving available data samples related to power consumption and associated with respective sample times, those available data samples being distributed into a sliding time window including at least one new batch of data samples, the available data samples being then called current samples, and into a past period preceding the time window, the data samples being then called past samples;
determining with at least one processor in said past period, selected past samples to be kept for the power consumption management, by eliminating part of the past samples in function of at least some of the current samples and of elimination conditions depending on at least one similarity criterion applied to at least the past samples;
providing the selected past samples as a complement to the current samples for the power consumption management.

According to the disclosure, the method comprises determining with the processor(s) the selected past samples by more precisely keeping among the past samples:
a first share of the past samples, consisting in most recent ones of the past samples, irrespective of the similarity criterion/criteria; and
a second share of the past samples through eliminating among the past samples deprived from the first share, called a complementary share of the past samples, part of the past samples in function of the at least some of the current samples, and of the elimination conditions depending on the similarity criterion/criteria applied to at least the first share and the complementary share of the past samples.

The method for selecting data samples is advantageously executed by a device for selecting data samples according to any of the embodiments of the disclosure.

A further object of the disclosure is a method for power consumption management comprising a method for selecting data samples according to the disclosure, and a method for providing decisional guidance relevant to the power consumption management based on the selected past samples and the current samples through machine learning processing.

In addition, the disclosure relates to a computer program comprising software code adapted to perform a method for selecting data samples and/or a method for power consumption management according to the disclosure, when it is executed by a processor.

The present disclosure further pertains to a non-transitory program storage device, readable by a computer, tangibly embodying a program of instructions executable by the computer to perform a method for selecting data samples and/or a method for power consumption management, compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

BRIEF DESCRIPTION OF THE DRAWINGS

The present disclosure will be better understood, and other specific features and advantages will emerge upon reading the following description of particular and non-restrictive illustrative embodiments, the description making reference to the annexed drawings wherein:

FIG. 2A, 2B, 2C, 2D schematically illustrates various applications of the system for power consumption management of FIG. 1 in individual, collective and interacting energy use situations;

On the figures, the drawings are not to scale, and identical or similar elements are designated by the same references.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein may represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
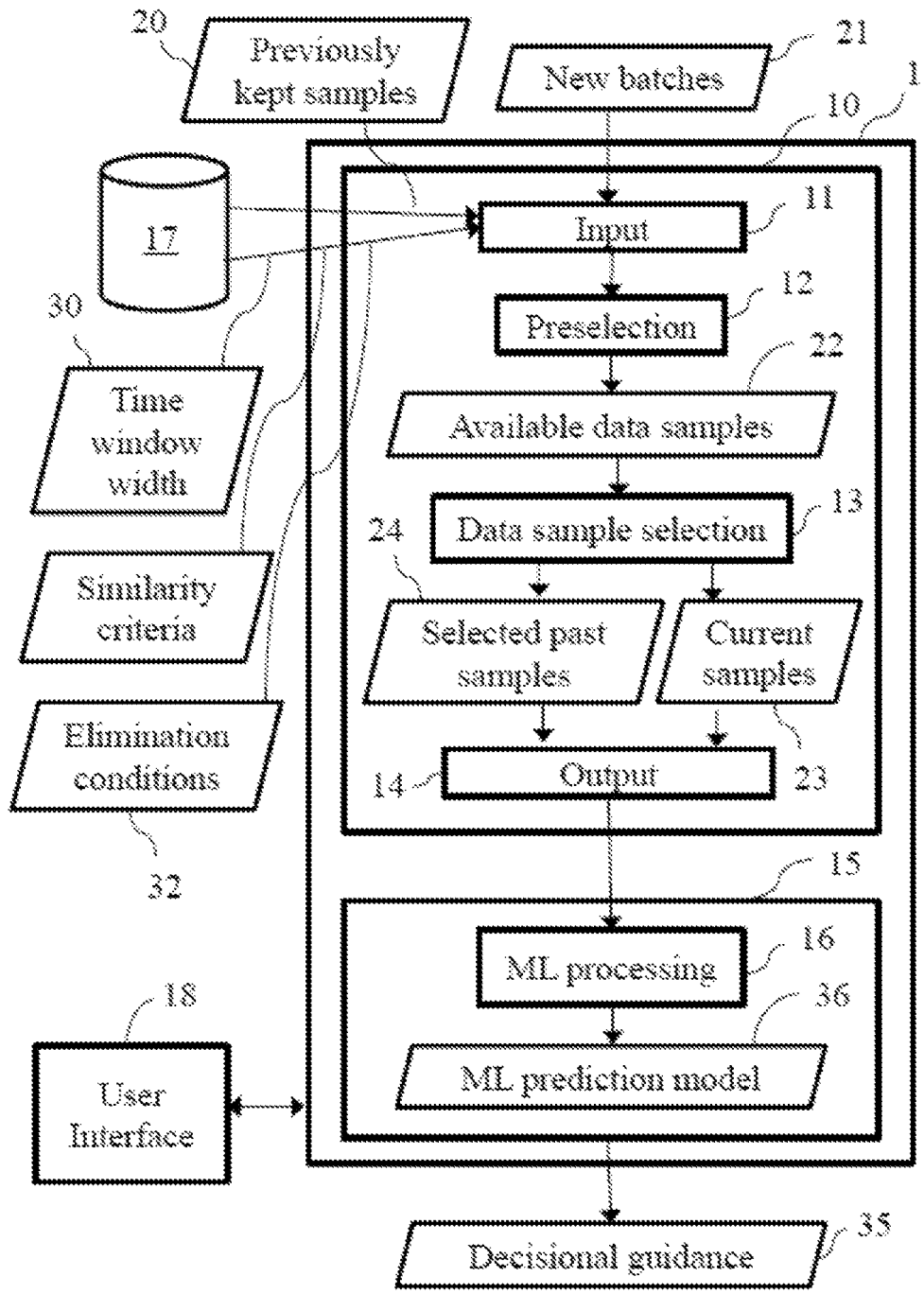
FIG. 1 is a block diagram representing schematically a particular mode of a system for power consumption management including a device for selecting data samples, compliant with the present disclosure.

The present disclosure will be described in reference to a particular functional embodiment of a system 1 for power consumption management, as illustrated on FIG. 1, and comprising an upstream device 10 for selecting data samples and a downstream device 15 for providing decisional guidance 35 relevant to power consumption management, that device 15 being fed by selected data samples provided by the device 10.

Though the presently described devices 10 and 15 are versatile and provided with several functions that can be carried out alternatively or in any cumulative way, other implementations within the scope of the present disclosure include devices having only parts of the present functionalities.

Each of the devices 10 and 15 is advantageously an apparatus, or a physical part of an apparatus, designed, configured and/or adapted for performing the mentioned functions and produce the mentioned effects or results. In alternative implementations, any of the device 10 and the device 15 is embodied as a set of apparatus or physical parts of apparatus, whether grouped in a same machine or in different, possibly remote, machines. The device 10 and/or the device 15 may e.g. have functions distributed over a cloud infrastructure and be available to users as a cloud-based service, or have remote functions accessible through an API.

The device 10 for selecting data samples and the device 15 for providing decisional guidance may be integrated in a same apparatus or set of apparatus corresponding to the system 1 for power consumption management, and intended to same users. In other implementations, the structure of device 10 may be completely independent of the structure of device 15, and may be provided for other users. For example, the device 10 may be exploited by a dedicated operator proposing proper upstream online selection of data samples to power management entities provided with ML capabilities embodied in the device 15, as subscribe ware services (a.k.a. SaaS, for Software as a Service).

The system 1 for power consumption management may have various kinds of applications, and be e.g. directed to private or professional energy consumers, individuals or collectivities, power sharing networked customers (such as with P2P energy trading), power suppliers, energy storage players, power network maintenance teams. It may be suited to proper balancing of non-renewable and renewable energy sources.

The system 1 may be suited to one or more target goals integrated in the internal processes of the system 1. Those goals may comprise any of e.g. decreasing energy losses, reducing power bills, mitigating incident risks, raising the share of renewables in an energy mix, supporting disabled people by facilitated energy management, timely adjusting power supply to industrial, customer or household needs, reducing levels of inside or outside pollution.

The system 1 may rely on ML operations, and automatically produce, set or adjust ML models, based on the processed data samples and the target goals as known to a skilled person. In this respect, the system 1 may implement reinforcement learning (in which interactions with a dynamic environment for performing a goal are exploited for maximizing feedbacks amounting to rewards), associated with any of the above-mentioned goals.

It may instead implement unsupervised learning (in which algorithms find themselves appropriate structures in raw inputs, i.e. without learning stage with labelled inputs), possibly in the form of feature learning (in which representations needed for feature detection or classification are automatically discovered), notably in the frame of anomaly identification.

Alternatively or in combination, the system 1 may exploit supervised learning, for example for initializing appropriate mappings between input information and targeted goals.

Instead of ML operations, and though usually less flexible and versatile than the latter, the system 1 may rely on one or more expert systems, fed with the data samples selected by the device 10.

The system 1 may be fully automated, the decisional guidance 35 being directly exploited for controlling, directing or adjusting proper actuators, or being transferred to one or more processors for intermediate operations before effective energy management circuit control.

Alternatively, the system 1 may provide the decisional guidance 35 as user-directed information, so as to drive users to undertake appropriate actions or to prompt proper reactions. For example, the system 1 may alert on risks linked to automatically detected anomalies, or to potentially damaging or dangerous failures. In other examples, the system 1 may indicate behavior, structure or networking changes required in view of one or more target goals.

In advantageous implementations, the system 1 is configured for repeated consideration over time of incoming data samples. This is all the more attractive in ML operations, in which the data samples may contribute to evolving the ML model. The system 1 may be more particularly suited to datastreams, being thereby able to regularly or continuously process new batches of incoming information.

In alternative implementations (which may be combined with the previous ones), the system 1 is adapted to deal with a single set of data samples previously obtained over time. For example, the system 1 is exploited for punctual anomaly detection, analysis or diagnostic, e.g. in preventing power failures. In another example, the system 1 is coupled with a software engine dealing with an incoming stream of data samples and exploited for power consumption management in a simpler way, less demanding in computing resources than the system 1 (e.g. from an expert system while the system 1 relies on ML operations, or based on simplified supervised ML while the system 1 relies on reinforcement learning), so as to complement and strengthen on demand the relevance of decisional guidance.

The data samples input to the system 1 are associated with respective sample times, e.g. via time stamps, and may comprise any kind of information pertaining to power consumption management, including targeted goals. They may notably comprise any selection among or combination of: power consumption or supply load or demand, monitored information from an outside environment, such as e.g. temperature, humidity, wind or other weather condition, or from an inside environment, such as e.g. temperature, humidity or atmospheric composition (such as $CO_2$ content), temporal information (irrespective of and complementary to the sample times) such as time of day, day of week, month or season, activity patterns such as working or leisure, occupancy patterns such as an absence of any people or a number of present people, locations in concerned buildings (e.g. floor, particular or open-plan office, reception desk), houses (e.g. rooms, stairs), apartments, factories, industrial plants or facilities.

The data samples may be provided to the system 1 via any appropriate communication network involving wired (e.g. Ethernet), wireless (e.g. WiFi, WiMax—standing for World-wide interoperability for Microwave Access, or Bluetooth) or cellular (e.g. UMTS—standing for Universal Mobile Telecommunications System, LTE—standing for Long-Term Evolution, or 5G) transmissions, as well known to a person skilled in the field.

They may be automatically obtained e.g. by sensors, meters, detectors or monitors. Alternatively or in combination, at least part of them may be user-entered.

Some illustrative implementations are as follows, in relation with FIGS. 2A, 2B, 2C and 2D. In a first example (FIG. 2A), power consumption in a house 41 is managed by a standalone computer 410, which may be e.g. a desktop or a laptop, so as to control the temperature in each room in function of user heating habits. The computer 410 embodies the system 1 with ML capabilities. Available input data together with respective associated times include the outdoor temperature (thermometer 411), a user presence (infrared detectors 412 arranged in the rooms) and whether the user is working or not on the concerned day (user-entered information). Output data include the temperatures in the respective rooms, which may take a limited number of values (for example low, medium and high). Additional inputs (with their respective times) directed to learning are given by the user's reactions to the selected room temperatures, whether by keeping or by changing them, which provides a measure of the user's satisfaction with the effected choices. Those inputs include the recording of whether the user reacted (binary data for each room) and the amended temperature levels (monitored by switches 413). It deserves noting that both the above inputs and outputs are parts of the data samples entered into the system 1. Also, those data samples are updated regularly over time, e.g. every 10 minutes. An efficiency feedback to minimize can consist in a number of user actions in modifying the automatically selected temperature rooms.

In a second example (FIG. 2B), power consumption in an office building 42 is managed by a mainframe computer 420 having agents embodying the system 1 with ML capabilities, so as to minimize energy losses and power expenses. Input data associated with respective times include occupancy patterns in respective rooms 421 (monitored by sensors 422), reference working hours (pre-entered), and effective energy expenses in the rooms 421 (as assessed from local switches 424, e.g. light, air conditioning or heating, computers on or off). Output data (with respective times) include overall power consumption (provided by overall meters 423) and energy invoices amounts Minimizing the energy losses and expenses may be based on automatic default adjustment of air conditioning, heating and lighting, under constraints of efficient working conditions, e.g. appropriate ranges of room temperatures and lighting levels. This provides additional inputs and outputs, all of them being parts of the data samples feeding the system 1. For example, the situation is upgraded, and the input and output data entered accordingly, every half hour.

A third example (FIG. 2C) relates to an interconnected energy sharing network 43, in which user dwellings 431, 432 are equipped with solar panels in addition to electricity supply, and able to receive as well as to provide energy depending on their needs and accumulated power loads. Power is thus regularly and flexibly exchanged over the energy network 43 between users. Some of the dwellings 431 own computing systems 430 embodying the system 1 for optimizing their energy balance, i.e. minimizing their energy expenses while maximizing their energy sales, while others 432 are not. Appropriate examples of inputs and outputs will not be developed here, but at least some of them should be apparent to a skilled person.

In variant implementations, the computing systems 430 of the dwellings 431 are not functioning as standalone agents, but are communicating together (via any proper wired or wireless telecommunication means) for sake of global power management optimization, in the frame of a distributed implementation of the system 1. This may contribute to significantly enhancing the performance of the network 43 as a whole compared with separate actions.

Advantageously, the system 1 is further adapted to identify anomalies in the network 43 and to automatically trigger energy exchange remedies and/or to alert involved users or operators.

A fourth example (FIG. 2D) regards a power supply network 44 involving a power supply facility 441 and energy customers 442. The power supply facility 441 is provided with a mainframe computer 440 embodying the system 1, for optimizing the load supply distribution over the network 44 so as to reconcile over time the energy resources available to the facility 441 (storage, production, reception) and the customer demands. Appropriate examples of inputs and outputs will not be developed here, but at least some of them should be apparent to a skilled person.

Figure 3:
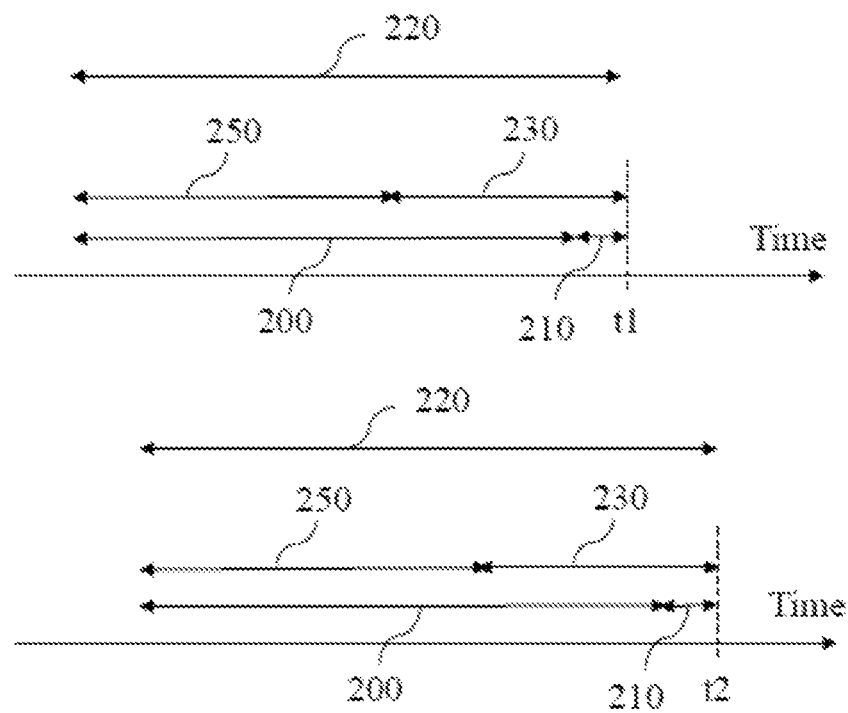
FIG. 3 represents a timeline with successive positions of a sliding time window, as exploited in the device for selecting data samples of FIG. 1.

More information will now be given on the data samples received by the system 1 (pertaining to input data as well as output data) for selection and for resulting decisional guidance, with reference to FIG. 3 besides FIG. 1.

The system is adapted to a dynamic process, so that one or more batches 21 of data samples ranging over a time interval 210 are completing previously obtained and kept data samples 20. For example, in regularly and possibly periodically gathering data in a given environment (e.g. every 10 minutes, half-hour or hour), each batch 21 of data may correspond to newly collected input and output data at a given time slot or at successive time slots (e.g. at 5 or 10 successive time slots). For sake of convenience, the time interval 210 is considered to start at the end of the previous data recording and to finish with the lastly collected data sample.

In addition, a sliding time window 230 having a window width 30 is taken into account in the system 1. The window width 30 may be set by a user so as to cover a roughly recurring cycle of events and situations. For example, the width may correspond to one day, one week, one month or one year. The window width 30 may be set to cover multiple batches of data samples, so that the width 30 is larger, and possibly substantially larger, than the time interval 210.

Instead of being set by the user, the window width 30 may be automatically determined by the system 1, or may have been previously determined before being exploited by the system 1. Notably, it may be derived from periodicity detection in time series. This may be achieved by Fourier transform analysis through a periodogram (giving an estimate of the spectral density of a signal) in the time domain and/or by autocorrelation of the time signal, as known to a skilled person. An example of an enhanced hybrid solution of the latter methods is presented by T. Puech et al. in "A fully automated periodicity detection in time series", International Workshop on Advanced Analysis and Learning on Temporal Data, pages 43-54, AALTD 2019. Another solution for potentially determining the window width in a dynamic way will be described below.

Since the processing by the system 1 is relying on the data samples of the sliding time window 230, called the current samples 23, having the time window 230 correspond to a time cycle makes possible an integration of time variations over that cycle in power consumption management. In addition, sliding the time window 230 so as to include the time interval 210 corresponding to the latest batches 21 of data may enable to take finely account of time variations extending beyond the time cycle. The time window 230 may thus have an end time position $t_1$, $t_2$ adapted to catch latest batches 21 of data samples.

The system 1 is thus relying on the data samples of the new batches 21 and on previously kept data samples 20, distributed over the part of the time window 230 preceding the time interval 210. The previously kept samples 20 extend however below the time window 230, and further covers past samples 25 older than the start of the time window 230 and distributed over a time interval 250. As a whole, a processing time range 220 comprising the time window 230 and the contiguously preceding time interval 250 is taken into account by the system 1.

The system 1 is interacting with a user interface 18, via which information can be entered and retrieved by a user. The user interface 18 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

The system 1 for power consumption management will now be detailed. In what follows, the modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the device 10 or of the device 15.

Starting with the device 15 for obtaining decisional guidance, it is provided for receiving selected data samples from the device 10 (including inputs and outputs) and for inducing from those samples the decisional guidance 35, on the ground of a module 16 for ML processing. The latter may be built from usual techniques directed to achieving the objectives detailed in the present disclosure, including notably Decision Trees, ANN, ensemble models or gradient boosting, as well known to a person skilled in the art. It will therefore not be developed here.

More precisely, the module 16 is configured for producing an ML prediction model 36 from the received samples, suited to produce the decisional guidance 35 based on those samples and possibly on further received samples.

In some variants, expert systems are used in the device 15 instead of ML processing. This may be relevant in some specific cases as simpler and faster, but usually at the cost of sensitive preliminary adjustment of the related parameters, and of less flexibility and lower robustness to variations in the concerned situations.

The device 10 for selecting data samples comprises an input module 11 adapted to receive the new batches 21 of data samples (e.g. via a received datastream) and the previously kept data samples 20, for example from one or more local or remote database(s) 17. The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk). In variant implementations, the previously kept data samples 20 may be streamed to the device 10.

The input module 11 is also adapted to receive the time window width 30 (e.g. from the database 17), when already available rather than being computed by the device 10. Other parameters can be received by the input module 11 (e.g. from the database 17), including similarity criteria 31, elimination conditions 32 and optionally a similarity ratio 33, as developed below (in following examples, the similarity ratio 33 is instead computed by the device 10).

The device 10 optionally comprises a preselection module 12, adapted to preselect part of the newly received data samples, e.g. in the new batches 21 when a preselection has already been effected on the previously kept data samples 20, or more broadly on the current samples 23 of the time window 230. The preselection module 12 may be particularly useful when receiving a datastream, since it enables to reduce in real time the size of the sample load to a desired dimension.

For example, a sampling round executed on the flight while gathering data ensures that the selected data are representative of what happens within the time window 230. The sampling may use a reservoir sampling strategy, so that all received samples have a same probability to be in the reservoir, the updated probability of the reservoir making it possible to do it on the flight.

Based on that preselection, a set of available data samples 22 is ready to be processed, which consists in the union of the past samples 25 and of the preselected samples of the time window 230 (i.e. the current samples 23).

In variant modes, the preselection module 12 is absent from the device 10 (whether the preselection has been executed upstream or all received samples are kept), so that the set of available data samples 22 to be processed is directly received as such by the device 10 instead of being mixed up with other data samples.

The device 10 also comprises a data sample selection module 13, configured for effecting an extraction of data samples among the received past samples 25, those extracted samples being called selected past samples 24. Such a selection introduces a forgetting mechanism in the oldest data, so as to avoid excessive computational costs while potentially getting a good sensitivity-stability tradeoff in a flexible way.

Figure 4:
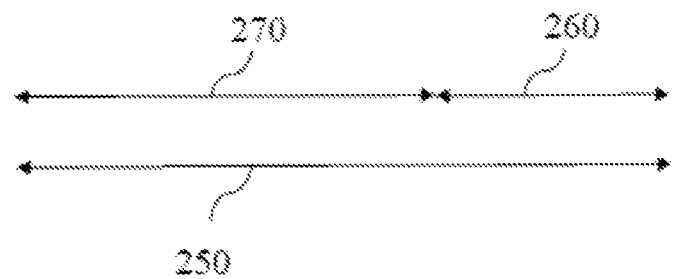
FIG. 4 focuses on a particular part of the timeline of FIG. 3, pertaining to data samples exploited in the device for selecting data samples of FIG. 1 while preceding the sliding time window (past samples)
Figure 5:
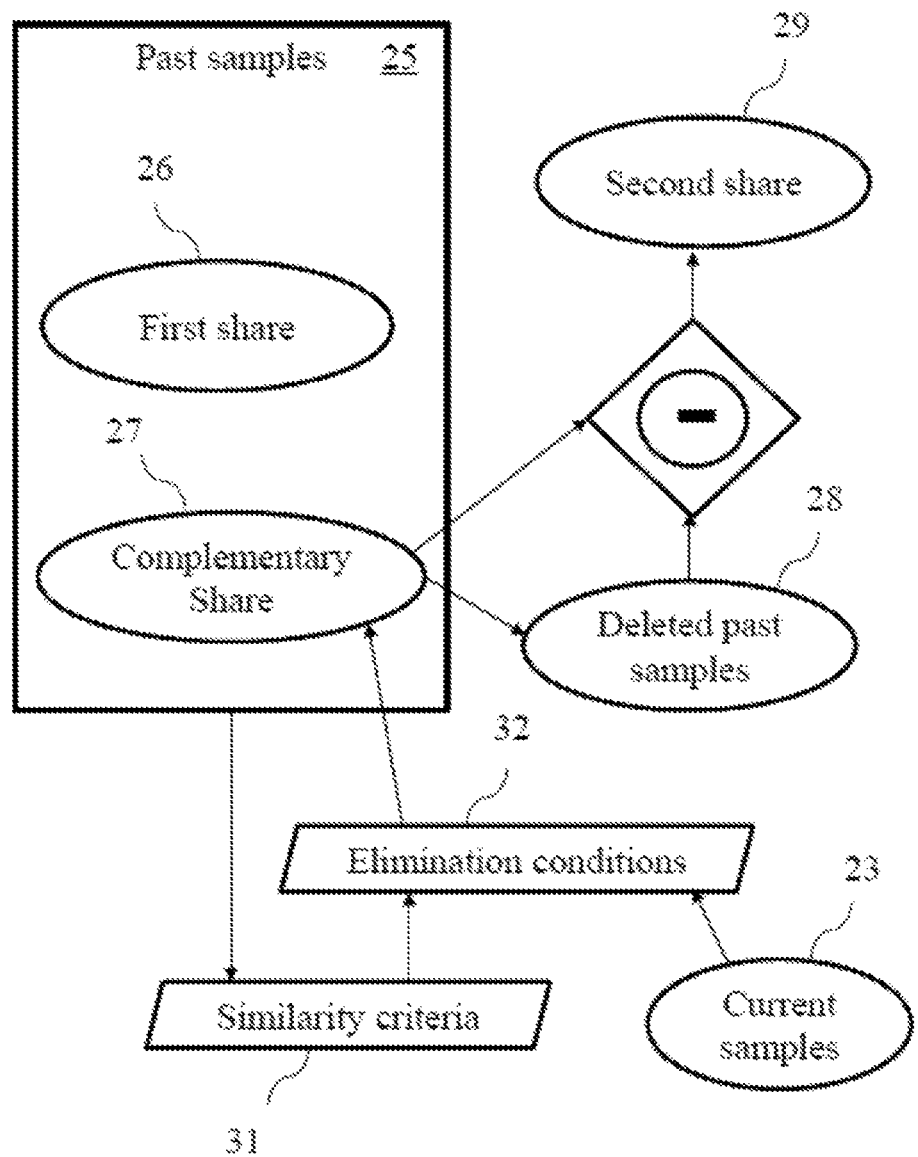
FIG. 5 focuses on the processing of the past samples by the device for selecting data samples of FIG. 1.

As illustrated on FIGS. 4 and 5, two kinds of forgetting operations are combined, respectively associated with a more recent sub-interval 260 and a contiguous older sub-interval 270 of the time interval 250.

More precisely, the past samples 25 consist of a first share 26 and a complementary share 27, respectively distributed in the sub-intervals 260 and 270. A first aspect of the selection carried out by the module 13 is that all data samples of the first share 26 are kept, i.e. that share is immune from deletion and falls within the selected past samples 24.

A second aspect of the selection is that part of the data samples belonging to the complementary share 27 are deleted, which leads to a reduced set forming a second share 29 of the selected past samples 24. The module 13 determines the deleted past samples 28 by the elimination conditions 32, which depend on both the similarity criteria 31 applied to the past samples 25 and on the current samples 23 associated with the time window 230.

Figure 6:
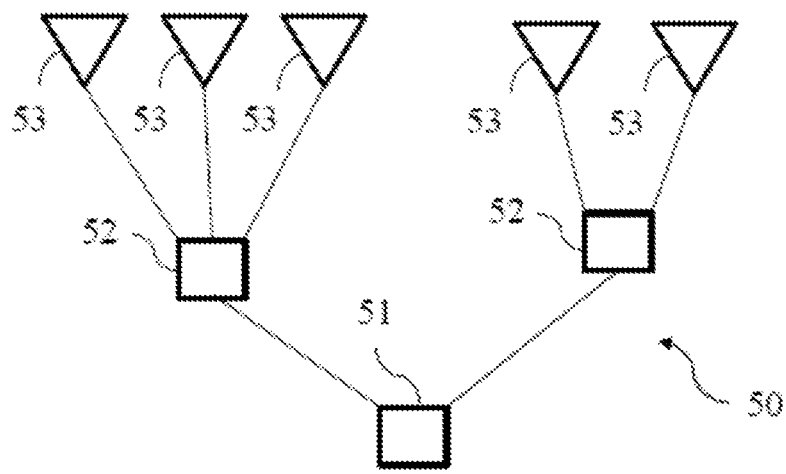
FIG. 6 schematically illustrates a decision tree relied on in a first processing mode of the past samples of FIG. 5.
Figure 7:
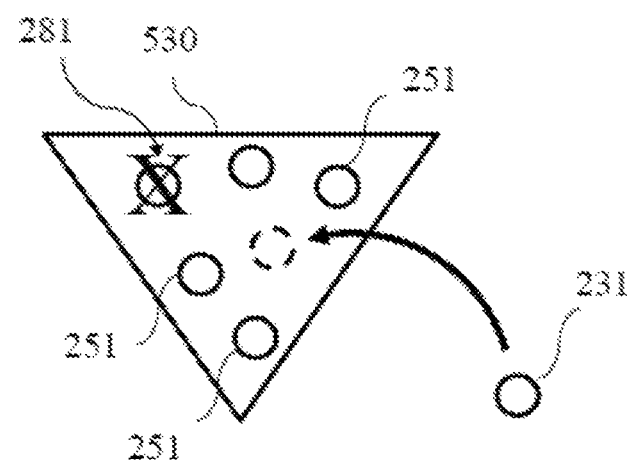
FIG. 7 shows the mechanism exploited with the decision tree of FIG. 6 in one of its leaves.

In a first implementation mode of the selection, illustrated on FIGS. 6 and 7, a decision tree 50 is built on the ground of the past samples 25, and comprises (in compliance with usual practice) a root 51, internal nodes 52, and leaves 53. The decision tree 50 may be obtained based on the automatic identification of feature similarities in the past samples 25, as known to a skilled person.

The decision tree 50 may be balanced in an enhanced way so as to improve accuracy, by using a gain function as described by A. Leroux et al. in "Information gain ratio correction: Improving prediction with more balanced decision tree splits", arXiv:1801.08310, 2018.

At least part of the current samples 23 is then mapped to the decision tree 50, where each of the leaves 53 may encompass one or more of the past samples 25. In each leaf 530 (FIG. 7), the arrival of one of the current samples 231 may induce the deletion of one of the past samples 281 belonging to the complementary share 27. For example, the assignment of any of the current samples 23 to one of the leaves 53 causes the incrementation of a leaf counter, until a deletion threshold is reached. The oldest sample 281 of the complementary share 27 in the leaf 530 is then removed.

In variant implementations, each of the samples belonging to the complementary share 27 in the leaf 530 is pre-weighted further to the decision tree construction, as an increasing function of the number of the past samples 25 in the leaf 530. The related weights are then increased whenever one of the current samples 321 arrives. Once a preset deletion threshold is reached for any of the weighted samples 281, the latter is removed.

In this way, rare behaviors tend to be kept (low-traffic leaf) while common behaviors tend to be forgotten (high-traffic leaf).

In advantageous embodiments, the current samples 23 are mapped to the decision tree 50 in a chronological order of those current samples 23 for the deletion process. In variants, the current samples 23 are mapped to the decision tree 50 while the deletion process is executed in a chronological order of the past samples 25 of the leaves 53.

At any rate, the total number of deleted samples may be compliant with a preset number of kept samples in the complementary share 27, i.e. the target size of the second share 29.

The total number of the selected past samples 24, i.e. in the first share 26 and in the second share 29, may be determined from an overall desired number of data samples for downstream processing by the device 15 (this overall number regarding the union of the current samples 23 and of the selected past samples 24) and by a desired balance between the first share 25 and the second share 29. The latter balance may be given by the similarity ratio 33 (as a hyper-parameter), noted q, giving the number of samples in the second share 29 divided by the total number of the selected past samples 24.

For example, a decision tree is to be built by the device 15 based on inputs from the device 10, and a maximum number of related operations is set. If e.g. the maximum number is 50,000 and the current samples 23 associated with the time window 230 are 25,000, 25,000 samples can be kept in the time interval 250 associated with the past samples 25. Among them, (1−q)×25,000 samples can be taken for the first share 26 (which is close to a time forgetting approach), and q×25,000 samples for the second share 29 (which is close to a similarity forgetting approach). Keeping the (1−q)×25,000 samples of the first share 26 provides the time length of the preserved sub-interval 260, while the q×25,000 samples of the second share 29 may be possibly scattered within the sub-interval 290. The device 15 is thus fed with the appropriate number 50,000 of samples for building its decision tree.

In variants, the current samples 23 or part of them are used together with the past samples 25 to build the decision tree 50, which is then exploited as described above.

In other implementations, multiples decision trees are built and exploited as above, e.g. with random forest or XGBoost models. In some modes, the module 13 is adapted to assign the samples to the leaves of each of the trees, and to compute a similarity score related to the number of samples in each of the decision trees. That similarity score is exploited in a similar way to the above for past sample deletions.

In a second implementation mode of the selection, the first share 26 and the second share 29 of the past samples 25 are used in an ML model providing predictions for power consumption management, and which may be carried out by the device 15. The past samples 25 are then respectively associated with resulting prediction errors, and lowest values of the latter are privileged for sample deletion in relation with the arrival of the current samples 23. Indeed, the prediction error provides a fair estimation of a similarity of a particular point.

Figure 8:
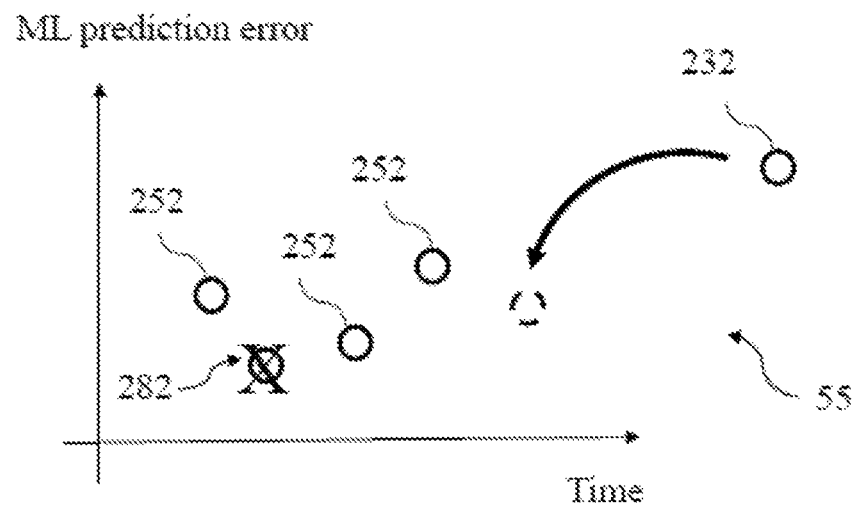
FIG. 8 schematically illustrates a distribution of data samples in function of machine learning prediction errors, as relied on in a second processing mode of the past samples of FIG. 5.

For example, as illustrated on FIG. 8, on the ground of a prediction error distribution 55 based on the past samples 25, past samples 252 belonging to the complementary share 27 and associated with the smallest errors are subject to being deleted (like the past sample 282) whenever one of the current samples 232 is entered. The deleted samples 28 then depend only on the number of the current samples 23.

In this way, samples more likely to be common are discarded in the first place, since corresponding to smaller prediction errors, while uncommon samples have more chances to be kept since corresponding to larger errors.

That generic exploitation of ML predictions makes the present strategy applicable to a vast range of models, including gradient boosting methods, neural networks and ensemble algorithms.

In variants, the current samples 23 or part of them are used together with the past samples 25 to build the ML model providing predictions for power consumption management, which is then exploited as described above.

Figure 9:
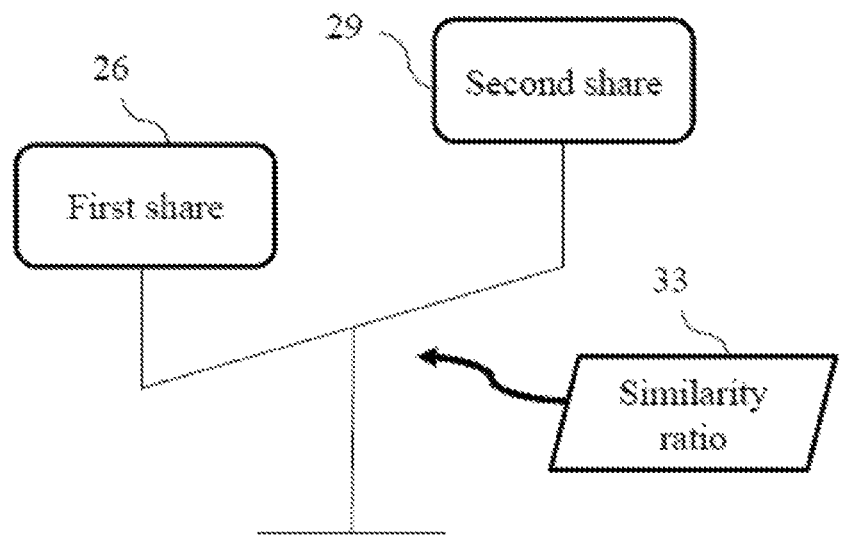
FIG. 9 represents the exploitation of a similarity ratio in tuning a balance of a first share and a second share of the past samples in the processing of FIG. 5.

More will be said now about the similarity ratio 33. As mentioned above and illustrated on FIG. 9, that ratio enables to tune the balance between the first share 26 and the second share 29 of the selected past samples 24.

In particular embodiments, the similarity ratio 33 is provided to the device 10, and properly set in function of the situations. For example, a high value is chosen for detecting anomalies on an electric network (the high level of similarity remembering enabling to keep odd behavior in memory), while a low value is chosen for reflecting a change of consumer behavior (the low level of similarity remembering enabling to forget old behavior as fast as possible).

Figure 10:
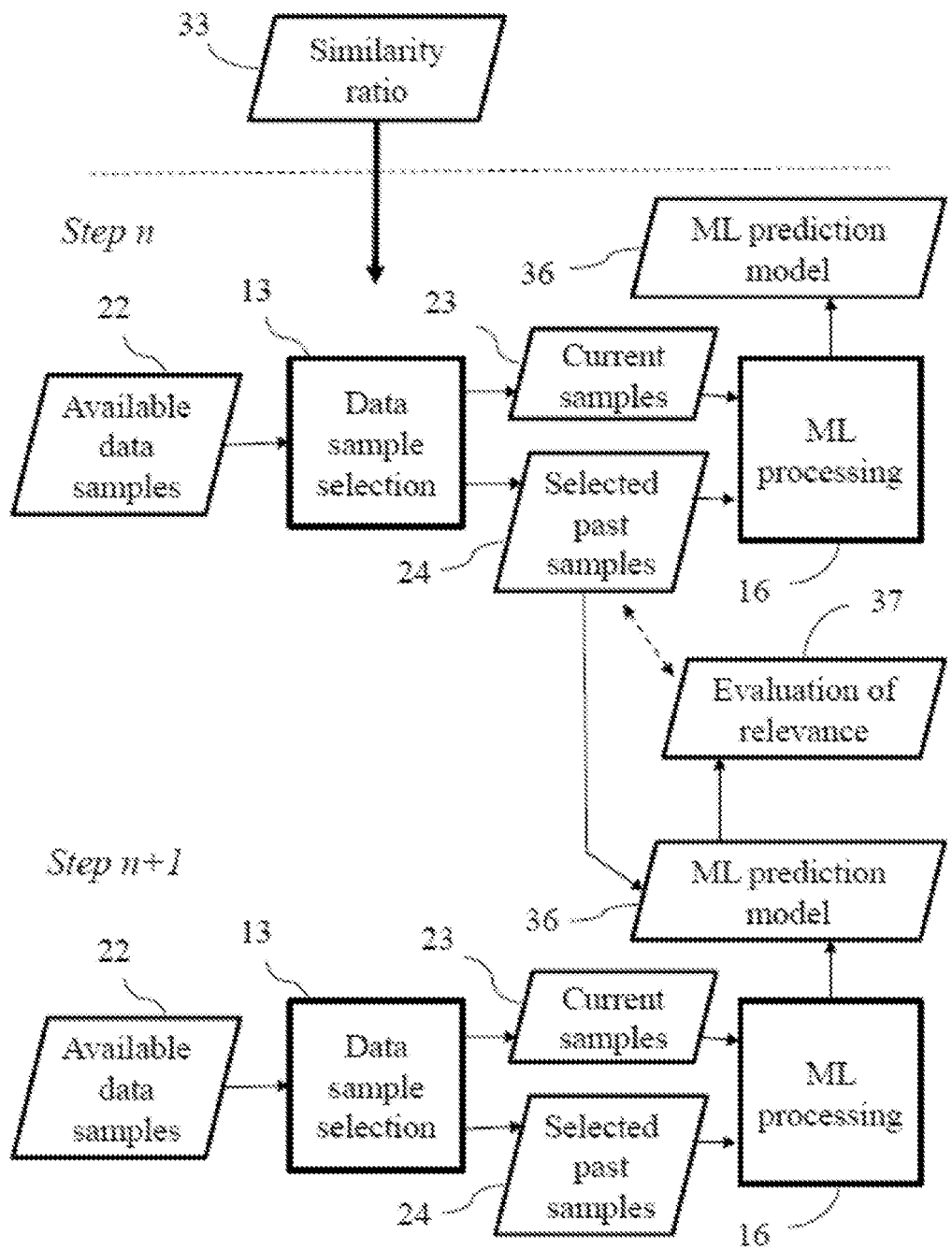
FIG. 10 illustrates a model for assessing the relevance of an instance of the similarity ratio of FIG. 9, in relation with machine learning processing.

In advantageous alternative implementations, the similarity ratio 33 is automatically tuned by the module 13 of the device 10, taking account of the ML processing of the device 15. This may enable to enhance the performances in a flexible and dynamic way. A rolling validation is for example carried out on the ground of time-series data, as explained below in relation with FIGS. 10 and 11.

At successive time positions of the time window 230 (indexed as n and n+1 on FIG. 10), for a given value q of the flexibility ratio 33, the ML prediction model 36 is built by the ML processing module 16 from the available data samples 22, through obtaining the current samples 23 and the selected past samples 24 with the module 13 for data sample selection. As apparent from the above explanations, the available data samples 22, the current samples 23 and selected past samples 24, and the ML prediction model 36 usually differ at each time position step of the time window 230 (while being presently noted in the same way for sake of convenience).

The selected past samples 24 at a given step, e.g. step n, are then submitted to the ML prediction model 36 of a next step, presently n+1, from which an overall evaluation of relevance 37 can be induced. The evaluation 37 thus reflects the relevance of the samples selected at a given step to the data of the next step.

Figure 11:
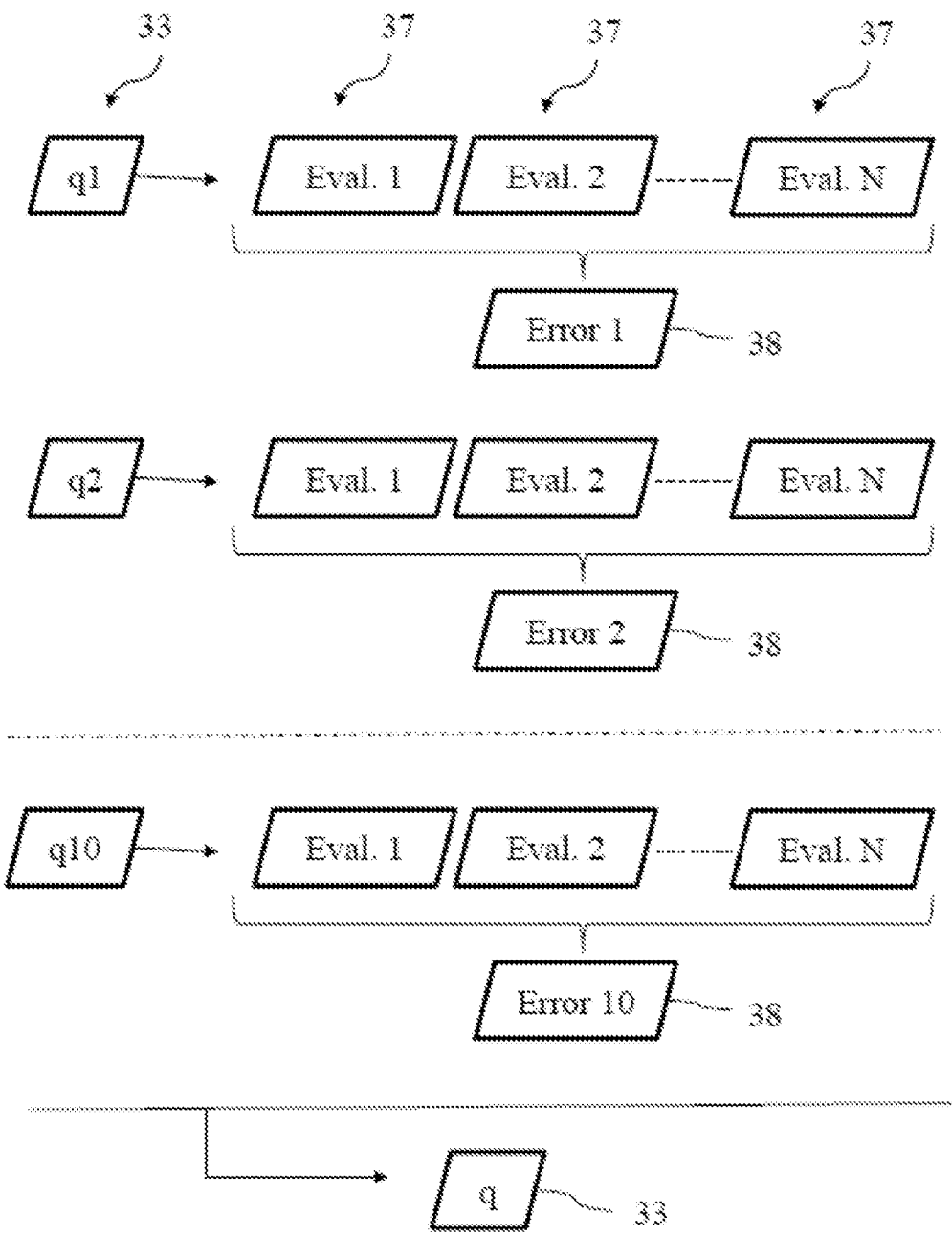
FIG. 11 show the exploitation of the model of FIG. 10 in determining a proper value of the similarity ratio of FIG. 9.

The evaluations 37 are obtained for successive time positions of the time window 230 and averaged, leading to an error 38 (FIG. 11). The same process is repeated for various candidate values $q_1, q_2 \ldots q_m$ of the similarity ratio 33, m being for example equal to 10. The value selected for the similarity ratio 33 is then the one entailing the smallest error 38.

This automatic selection of the similarity ratio 33 ensures that the algorithm is not based on already seen data, while being able to detect concept drift.

In practice, it is observed that testing around 10 values of the similarity ratio 33 may provide a satisfying selection of a proper value q while avoiding additional computation costs.

A similar technique may possibly be employed for automatically determining the time window width 30 (which is another hyper-parameter), instead of the previously described related implementations.

The device 10 further includes an output module 14, adapted to receive the current samples 23 and the selected past samples 24 from the data sample selection module 13, and to provide them to the device 15.

Figure 12A:
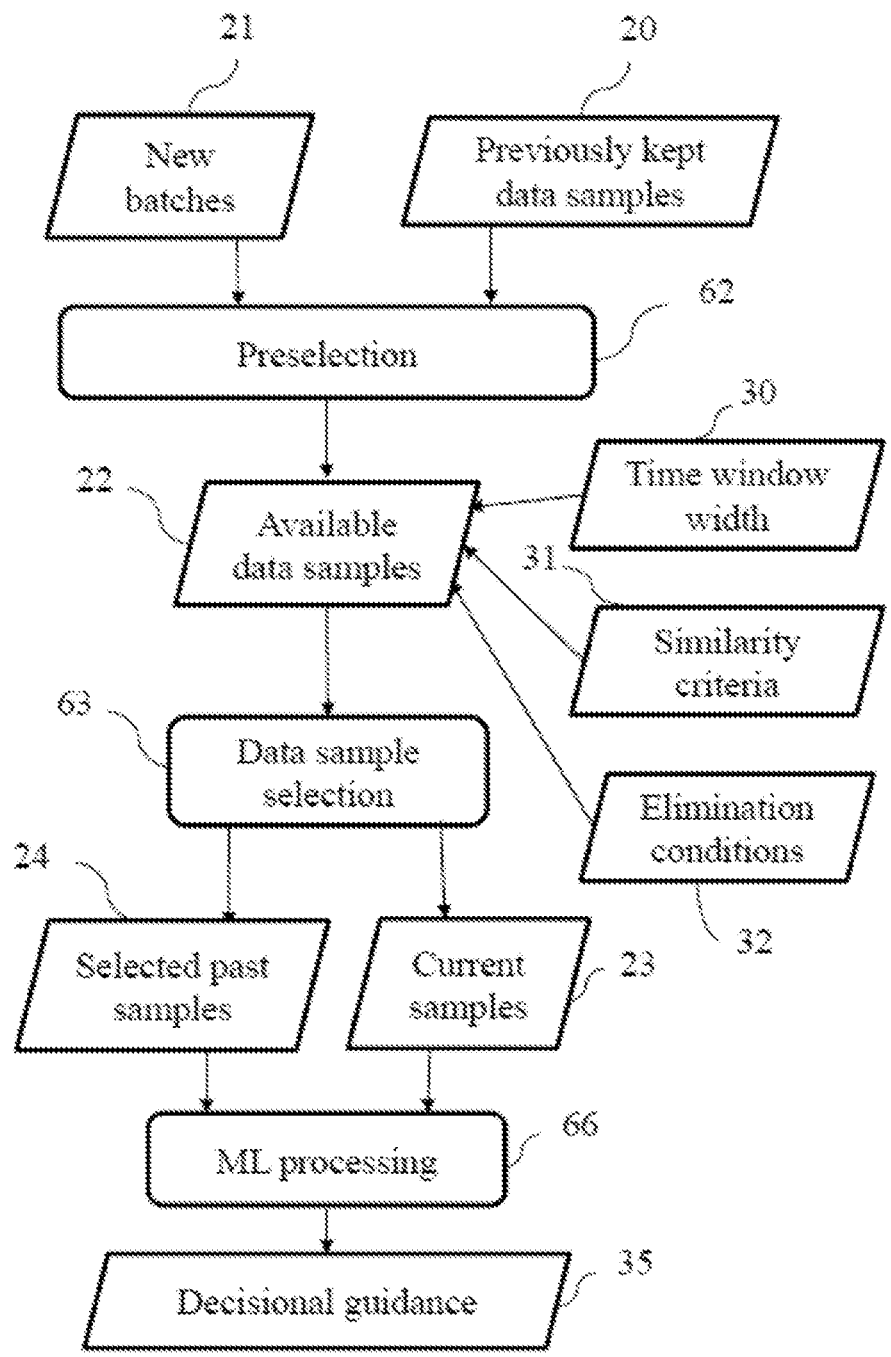
FIG. 12A is a flow chart showing successive steps executed with the system for power consumption management of FIG. 1.
Figure 12B:
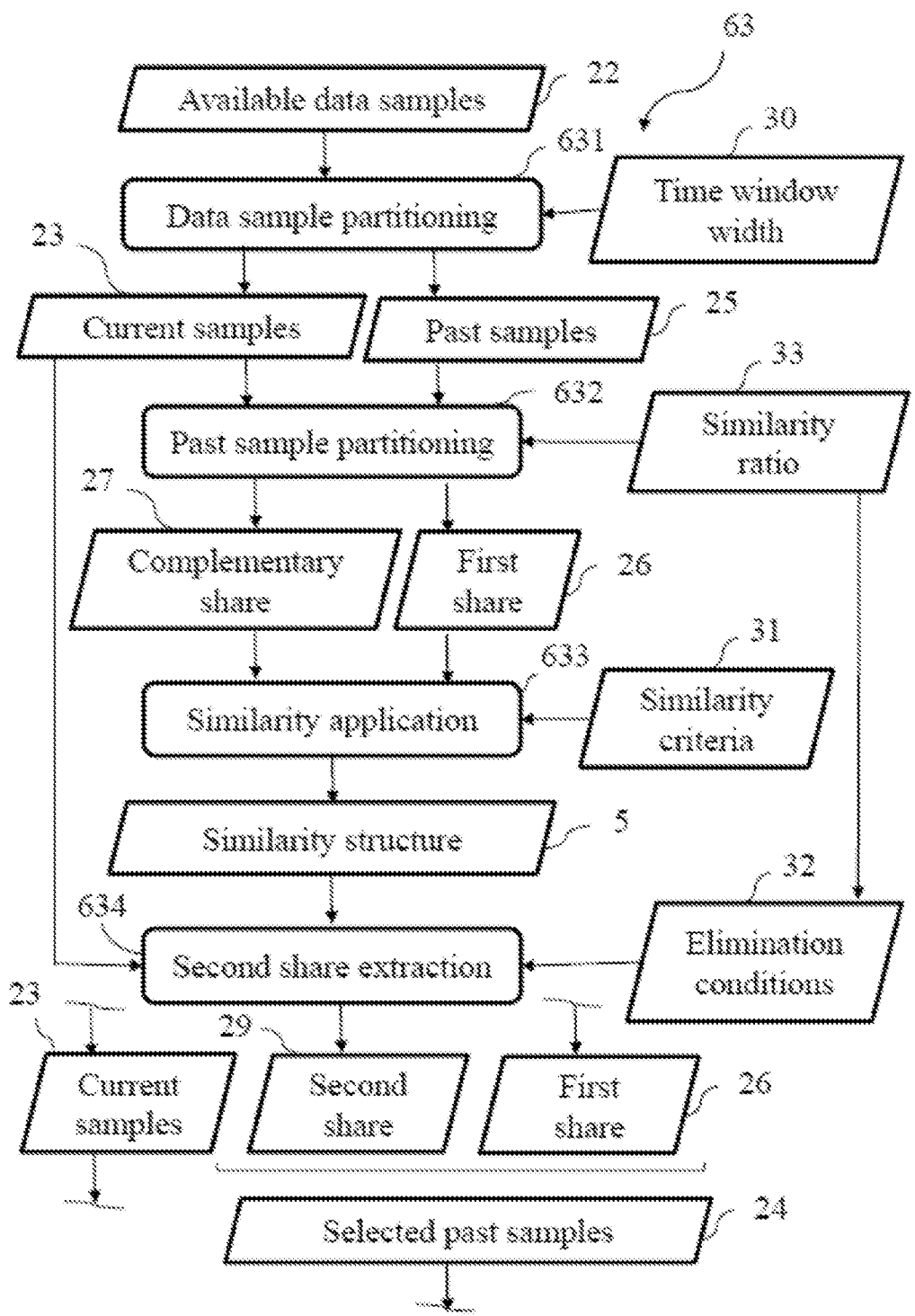
FIG. 12B details steps of data sample selection in the flow chart of FIG. 12A.

In operation, the system 1 may for example execute the following process, in relation with FIGS. 12A and 12B:
- preselect the available data samples 22 from the new batches 21 and from the previously kept samples 20 (step 62),
- proceed with data sample selection among the available data samples 22, by using the time width 30, the similarity criteria 31 and the elimination conditions 32, so as to produce the current samples 23 and the selected past samples 24 (step 63),
- apply an ML processing to the selected data samples and induce therefrom the decisional guidance 35 (step 66).

More precisely, the data sample selection step 63 may hinge on the following operations:

partition the available data samples 22 into the current samples 23 and the past samples 25, based on the time window width 30 (step 631), partition the past samples 25 into the first share 26 and the complementary share 27, based on the similarity ratio 33 (step 632), apply a similarity algorithm to the past samples 632, including the first share 26 and the complementary share 27, based on the similarity criteria 31, so as to obtain a similarity structuration 5 of the past samples 25 (step 633), extract the second share 29 from the similarity structuration 5, the elimination conditions 32 and the current samples 23 while taking account of the similarity ratio 33 (step 634).

Figure 13:
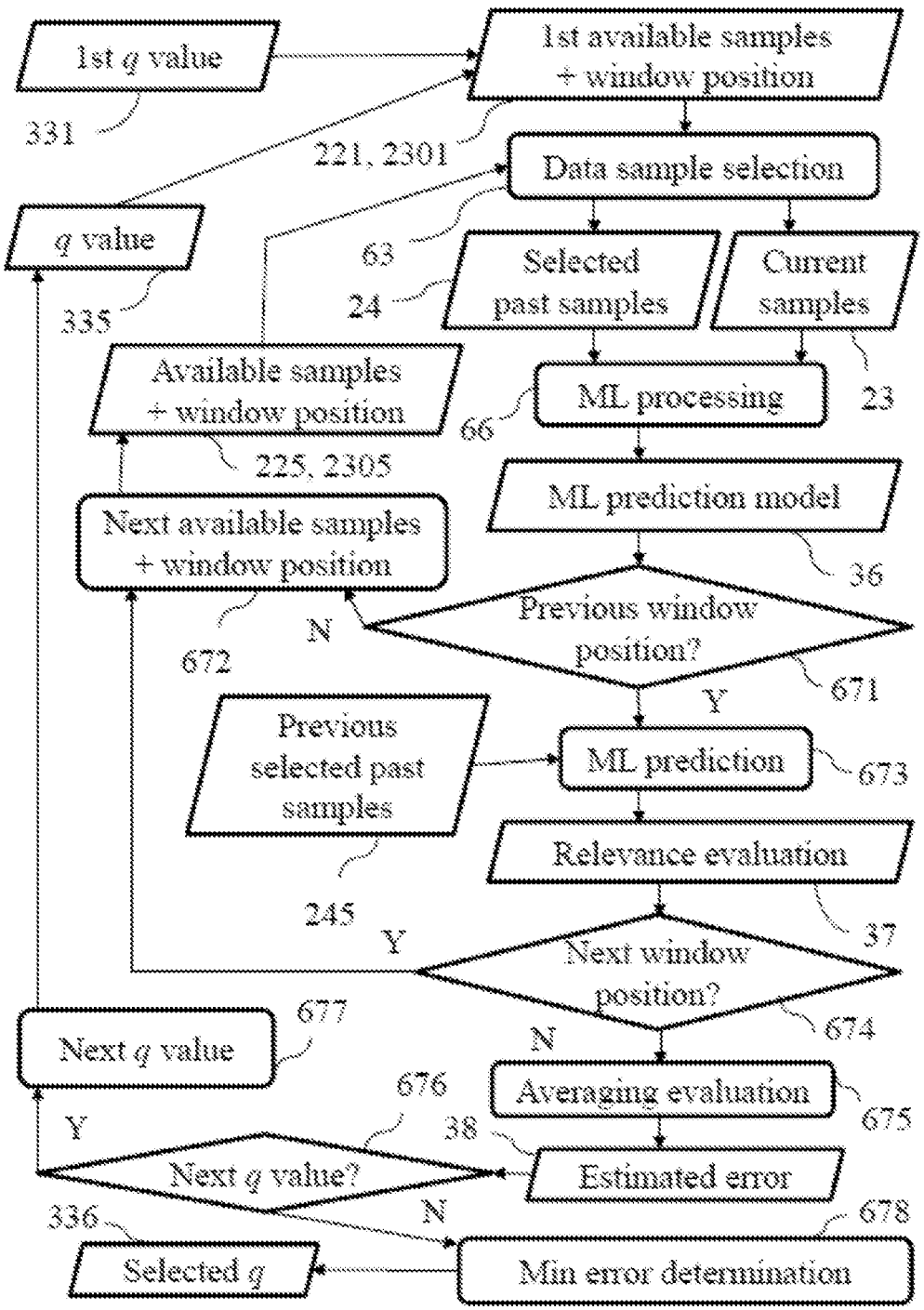
FIG. 13 is a flow chart showing successive steps executed with the device for selecting data sample of FIG. 1 in determining a proper value of the similarity ratio dealt with in FIGS. 9 to 11.

In addition, in operation, the system 1 may for example execute the following process for automatically and dynamically determining the similarity ratio 33, as shown on FIG. 13:

for a first value 331 of the similarity ratio 33 and a first value 2301 of the time window position, proceed with the step 63 of data sample selection on first available data samples 221, apply the ML processing step 66 to the obtained current samples 23 and selected past samples 24, so as to obtain the ML prediction model 36, test whether a previous time window position is available (step 671), if a previous time window position is not available, switch to a next available time window position associated with a current value 2305 of the time window position and with current available data samples 225 (step 672), and proceed with the data selection step 63 and the ML processing step 66 as above based on the updated data, if a previous time window position is available, apply the ML prediction to the past samples 245 selected at the previous step so as to obtain the related evaluation of relevance 37 (step 673), test whether a next time window position is available (step 674), if a next time window position is available, switch to that next position having a current value 2305 and associated with current available data samples 225 (step 672), and proceed with the data selection step 63, the ML processing step 66 and the ML prediction step 673 as above based on the updated data, if a next time window position is not available, average the evaluations of relevance 37 over the successive time window positions for the first value 331 of the similarity ratio, so as to produce the estimated error 38 (step 675), test whether a next value of the similarity ratio 33 is available (step 676), if a next value of the similarity ratio 33 is available, switch to that next value 335 and re-execute the above steps so as to obtain the corresponding error 38 (step 677), if a next value of the similarity ratio 33 is not available, select the value 336 of the similarity ratio 33 associated with the smallest value of the error 38 (step 678).

Figure 14:
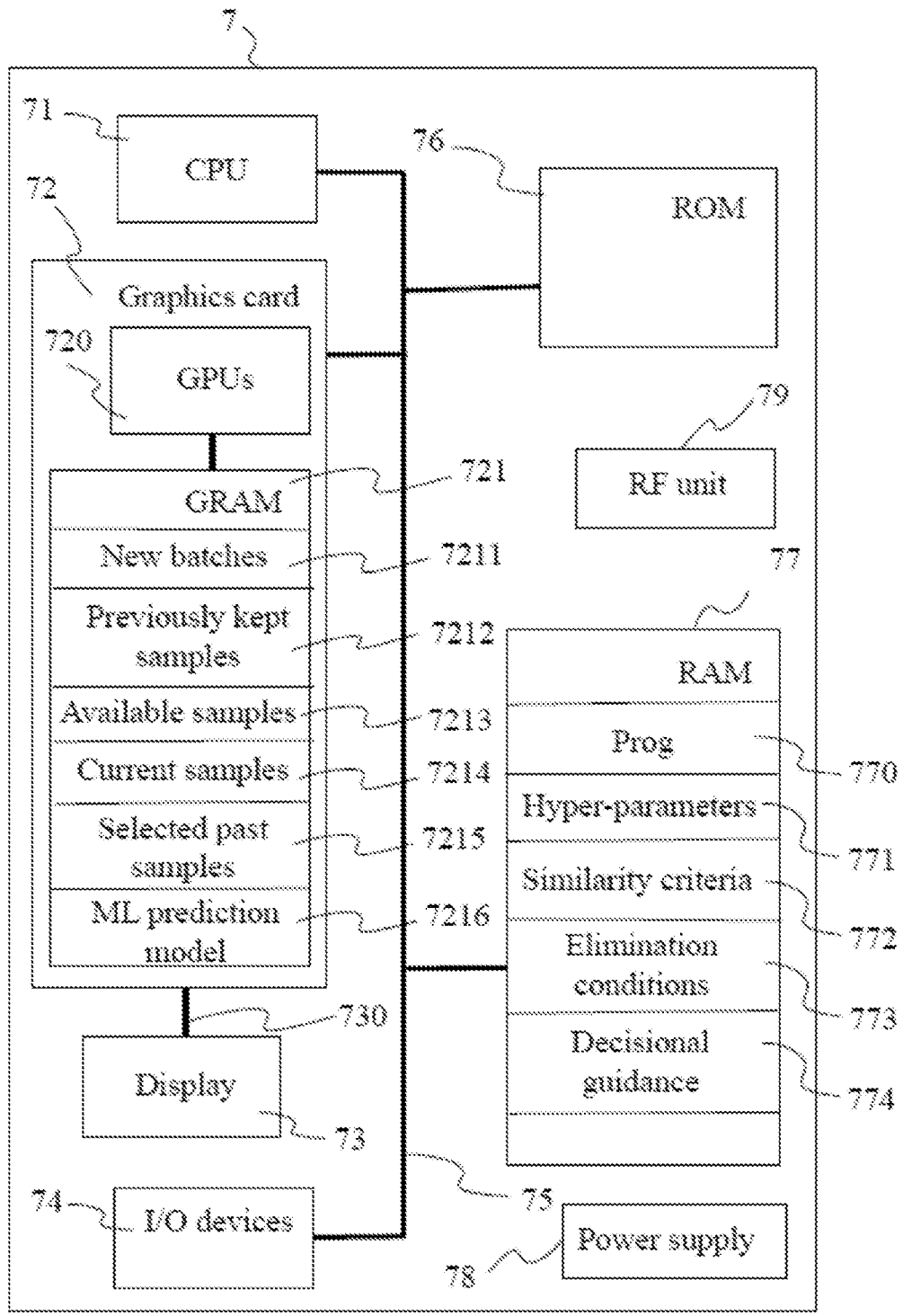
FIG. 14 diagrammatically shows an apparatus integrating the functions of the system for power consumption management of FIG. 1.

A particular apparatus 7, visible on FIG. 14, is embodying the system 1 as described above. It corresponds for example to a mainframe computer, a workstation, a laptop, a tablet, a smartphone, or a head-mounted display (HMD).

That apparatus 7 is suited to selecting data samples and providing decisional guidance. It comprises the following elements, connected to each other by a bus 75 of addresses and data that also transports a clock signal:

a microprocessor 71 (or CPU);

a graphics card 72 comprising several Graphical Processing Units (or GPUs) 720 and a Graphical Random Access Memory (GRAM) 721; the GPUs are quite suited to repeated computations on the data samples, due to their highly parallel structure;

a non-volatile memory of ROM type 76;

a RAM 77;

one or several I/O (Input/Output) devices 74 such as for example a keyboard, a mouse, a trackball, a webcam; other modes for introduction of commands such as for example vocal recognition are also possible;

a power source 78; and a radiofrequency unit 79.

According to a variant, the power supply 78 is external to the apparatus 7.

The apparatus 7 also comprises a display device 73 of display screen type directly connected to the graphics card 72 to display synthesized images calculated and composed in the graphics card. The use of a dedicated bus 730 to connect the display device 73 to the graphics card 72 offers the advantage of having much greater data transmission bitrates and thus reducing the latency time for the displaying of images composed by the graphics card, e.g. for ML representations. According to a variant, a display device is external to apparatus 7 and is connected thereto by a cable or wirelessly for transmitting the display signals. The apparatus 7, for example through the graphics card 72, comprises an interface for transmission or connection adapted to transmit a display signal to an external display means such as for example an LCD or plasma screen or a video-projector. In this respect, the RF unit 79 can be used for wireless transmissions.

It is noted that the word "register" used hereinafter in the description of memories 77 and 721 can designate in each of the memories mentioned, a memory zone of low capacity (some binary data) as well as a memory zone of large capacity (enabling a whole program to be stored or all or part of the data representative of data calculated or to be displayed). Also, the registers represented for the RAM 77 and the GRAM 721 can be arranged and constituted in any manner, and each of them does not necessarily correspond to adjacent memory locations and can be distributed otherwise (which covers notably the situation in which one register includes several smaller registers).

When switched-on, the microprocessor 71 loads and executes the instructions of the program contained in the RAM 77.

The random access memory 77 comprises notably:

in a register 770, the operating program of the microprocessor 71;

in a register 771, the hyper-parameters including the window width 30 and the similarity ratio 33;

in a register 772, the similarity criteria 31;

in a register 773, the elimination conditions 32;

in a register 774, the decisional guidance 35.

Algorithms implementing the steps of the method specific to the present disclosure and described above are stored in the memory GRAM 721. When switched on and once the parameters 771 to 774 are loaded into the RAM 77, the graphic processors 720 of graphics card 72 load appropriate information and parameters into the GRAM 721 and execute the instructions of algorithms in the form of microprograms.

The random access memory GRAM 721 comprises notably:

in a register 7211, the new batches 21;

in a register 7212, the previously kept samples 20;

in a register 7213, the available data samples 22;
in a register 7214, the current samples 23;
in a register 7215, the selected past samples 24;
in a register 7216, the ML prediction model 36.

As will be understood by a skilled person, the presence of the graphics card 72 is not mandatory, and can be replaced with entire CPU processing and/or simpler visualization implementations.

In variant modes, the apparatus 7 may include only the functionalities of the device 10 for selecting data samples, or only the functionalities of the device 15 for providing decisional guidance. In addition, the device 10 and/or the device 15 may be implemented differently than a standalone software, and an apparatus or set of apparatus comprising only parts of the apparatus 7 may be exploited through an API call or via a cloud interface.

The invention claimed is:

1. A device for selecting data samples related to power consumption so as to proceed with power consumption management, said device comprising:
    at least one input adapted to receive available data samples related to power consumption and associated with respective sample times, said available data samples being distributed into a sliding time window including at least one new batch of data samples, said available data samples being then called current samples, and into a past period preceding said time window, said available data samples being then called past samples;
    at least one processor configured for determining in said past period, selected past samples to be kept for said power consumption management, by keeping among said past samples:
        a first share of said past samples, consisting in most recent ones of said past samples, irrespective of said at least one similarity criterion; and
        a second share of said past samples through eliminating among said past samples deprived from said first share, called a complementary share of said past samples, part of said past samples in function of said at least some of said current samples, and of said elimination conditions depending on said at least one similarity criterion applied to at least the first share and the complementary share of said past samples;
    wherein said at least one processor is configured for determining said first share and said second share of said past samples so that said first share and said second share have relative proportions given by a hyper-parameter;
    at least one output adapted to provide said selected past samples as a complement to said current samples for said power consumption management;
    and
    detect, based on the selected past samples and after an elimination step of eliminating the part of said past samples, a predicted anomaly in a power system based on received available data samples; and
    provide, to a user, in advance of a predicted timing of the predicted anomaly, a notification comprising the predicted anomaly and decisional guidance relating to the predicted anomaly;
    wherein:
        said at least one input is adapted to receive evaluations of relevance of said selected past samples, said evaluations of relevance being respectively associated with successive time positions of said time window and determined with respect to machine learning processing for said power consumption management corresponding to next time positions of said time window; and
        said at least one processor is configured for determining said hyper-parameter by selecting among at least two candidate values of said hyper-parameter a best candidate value providing smallest averaged errors associated with said evaluations of relevance over said successive time positions of said time window.

2. The device for selecting data samples according to claim 1, wherein:
    said at least one input is adapted to repeatedly receive over time updated sets of said available data samples, derived from keeping in previous sets of said available data samples at least part of said current samples and of said selected past samples;
    said at least one processor is configured for repeatedly determining said selected past samples among said updated sets of said available data samples; and
    said at least one output is adapted to repeatedly provide said selected past samples of said updated sets, for dynamically proceeding with said power consumption management over time.

3. The device for selecting data samples according to claim 1, wherein said at least one processor is configured for eliminating oldest ones of said past samples in respective clusters of said available data samples obtained from said at least one similarity criterion applied to at least the first share and the complementary share of said past samples, in function of said elimination conditions depending on assignments to said clusters of said at least some of said current samples.

4. The device for selecting data samples according to claim 3, wherein said at least one processor is configured for eliminating in said respective clusters said oldest ones of said past samples through taking account of said at least some of said current samples in a chronological order of said current samples.

5. The device for selecting data samples according to claim 3, wherein said elimination conditions for at least one of said clusters include a cumulated amount of said available data samples in said at least one of said clusters being above a preset threshold.

6. The device for selecting data samples according to claim 3, wherein said clusters are built from at least one decision tree model, said clusters corresponding to leaf nodes.

7. The device for selecting data samples according to claim 1, wherein said at least one similarity criterion used for eliminating said part of said complementary share is given by lowest prediction errors associated with said past samples in relation with a machine learning model for said power consumption management, said machine learning model providing predictions based on at least the first share and the complementary share of said past samples.

8. The device for selecting data samples according to claim 1, wherein said at least one processor is configured for eliminating said part of said past samples based on said at least one similarity criterion being applied to said past samples irrespective of said current samples.

9. The device for selecting data samples according to claim 1, wherein said power consumption management includes at least one of power failure detection and power consumption dynamic adaptation.

10. A system for power consumption management comprising a device for selecting data samples according to claim 1, and a device for providing decisional guidance relevant to said power consumption management based on said selected past samples and said current samples through machine learning processing.

11. A method for selecting data samples related to power consumption so as to proceed with power consumption management, said method comprising:
receiving available data samples related to power consumption and associated with respective sample times, said available data samples being distributed into a sliding time window including at least one new batch of data samples, said available data samples being then called current samples, and into a past period preceding said time window, said available data samples being then called past samples;
determining with at least one processor in said past period, selected past samples to be kept for said power consumption management, keeping among said past samples:
a first share of said past samples, consisting in most recent ones of said past samples, irrespective of said at least one similarity criterion; and
a second share of said past samples through eliminating among said past samples deprived from said first share, called a complementary share of said past samples, part of said past samples in function of said at least some of said current samples, and of said elimination conditions depending on said at least one similarity criterion applied to at least the first share and the complementary share of said past samples;
wherein said at least one processor operates to determine said first share and said second share of said past samples so that said first share and said second share have relative proportions given by a hyper-parameter;
providing said selected past samples as a complement to said current samples for said power consumption management;
detecting, based on the selected past samples and after an elimination step of eliminating the part of said past samples, a predicted anomaly in a power system based on received available data samples; and
providing, to a user, in advance of a predicted timing of the predicted anomaly, a notification comprising the predicted anomaly and decisional guidance relating to the predicted anomaly;
wherein:
receiving the available data samples further comprises receiving evaluations of relevance of said selected past samples, said evaluations of relevance being respectively associated with successive time positions of said time window and determined with respect to machine learning processing for said power consumption management corresponding to next time positions of said time window; and
wherein determining the hyper-parameter with the at least one processor comprises selecting among at least two candidate values of said hyper-parameter a best candidate value providing smallest averaged errors associated with said evaluations of relevance over said successive time positions of said time window.

12. A method for power consumption management comprising a method for selecting data samples according to claim 11, and a method for providing decisional guidance relevant to said power consumption management based on said selected past samples and said current samples through machine learning processing.

13. A non-transitory computer-readable medium comprising a computer program comprising software code operable to configure a processor to selectively perform each of
a method for selecting data samples according to claim 11; and
a method for power consumption management comprising said method for selecting data samples, and a method for providing decisional guidance relevant to said power consumption management based on said selected past samples and said current samples through machine learning processing.

14. The device for selecting data samples according to claim 1, wherein the at least one output is further adapted to:
detect, based on the selected past samples and after an elimination step of eliminating the part of said past samples, a predicted anomaly in a power system based on received available data samples; and
automatically, at or before a predicted timing of the predicted anomaly, execute at least one machine process or control at least one actuator.

15. The device for selecting data samples according to claim 1, wherein the at least one input is configured to interface with a plurality of sensors, each of said sensors comprising at least one of an environmental sensor or a power consumption sensor, and wherein the at least one input is configured to receive at least a portion of the available data samples from the plurality of sensors.

16. The device for selecting data samples according to claim 15, wherein the plurality of sensors are environmental sensors disposed at a plurality of fixed locations, and wherein the available data samples include environmental data from each of the fixed locations.

17. The device for selecting data samples according to claim 15, wherein the plurality of sensors are power consumption sensors disposed at a plurality of fixed locations, each of the power consumption sensors associated with at least one power system disposed at one of the plurality of fixed locations and having a variable power usage.

* * * * *